US009495922B2

(12) United States Patent
Hirabayashi et al.

(10) Patent No.: US 9,495,922 B2
(45) Date of Patent: Nov. 15, 2016

(54) DISPLAY DEVICE, DISPLAY METHOD, AND ELECTRONIC DEVICE

(71) Applicant: Japan Display Inc., Tokyo (JP)

(72) Inventors: Yukiya Hirabayashi, Nagano (JP); Koji Shimizu, Nagano (JP); Yutaka Ozawa, Nagano (JP)

(73) Assignee: Japan Display Inc., Tokyo (JP)

( * ) Notice: Subject to any disclaimer, the term of this patent is extended or adjusted under 35 U.S.C. 154(b) by 733 days.

(21) Appl. No.: 13/772,495

(22) Filed: Feb. 21, 2013

(65) Prior Publication Data

US 2013/0241814 A1    Sep. 19, 2013

(30) Foreign Application Priority Data

Mar. 15, 2012  (JP) .................................. 2012-058218

(51) Int. Cl.
  *G09G 3/36*  (2006.01)
  *G06F 3/041*  (2006.01)
  *G06F 3/044*  (2006.01)

(52) U.S. Cl.
  CPC ............. *G09G 3/3611* (2013.01); *G06F 3/044* (2013.01); *G06F 3/0412* (2013.01); *G06F 3/0416* (2013.01); *G09G 3/3677* (2013.01)

(58) Field of Classification Search
  CPC ................ G09G 3/3611; G09G 3/3677; G09G 2310/0286; G09G 2310/0267; G06F 3/0412; G06F 3/0416; G06F 3/044
  See application file for complete search history.

(56) References Cited

U.S. PATENT DOCUMENTS 6,903,716 B2 * 6/2005 Kawabe et al. ................ 345/99
8,736,544 B2 * 5/2014 Shimoshikiryoh et al. .. 345/103
2006/0007094 A1 * 1/2006 Kang et al. ..................... 345/98
2011/0102389 A1 * 5/2011 Park ...................... G06F 3/0412
  345/205
2012/0044167 A1   2/2012 Nakanishi et al.

FOREIGN PATENT DOCUMENTS

| CN | 100476524 C | 4/2009 |
|---|---|---|
| CN | 102224538 A | 10/2011 |
| CN | 102376286 A | 3/2012 |
| JP | 09-292861 | 11/1997 |
| JP | 2007-140512 | 6/2007 |
| WO | WO-2010/061685 A1 | 6/2010 |

OTHER PUBLICATIONS

Japanese Office Action issued Feb. 3, 2015 for corresponding Japanese Application No. 2012-058218.
Chinese Office Action issued Mar. 29, 2016 for corresponding Chinese Application No. 201310039162.1.

* cited by examiner

*Primary Examiner* — Jonathan Boyd
*Assistant Examiner* — Sardis F Azongha
(74) *Attorney, Agent, or Firm* — Michael Best & Friedrich LLP

(57) ABSTRACT

Disclosed herein is a display device including: a display section configured to have a plurality of scanning signal lines to which respective scanning signals are applied, the display section performing line-sequential scanning by repeating interruption and resumption of the line-sequential scanning on a basis of the plurality of scanning signals, and displaying an image; and a scanning section configured to generate the plurality of scanning signals such that transition times on a pulse termination side of the respective scanning signals are equal to each other.

19 Claims, 31 Drawing Sheets

FIG.1A
FIG.1B
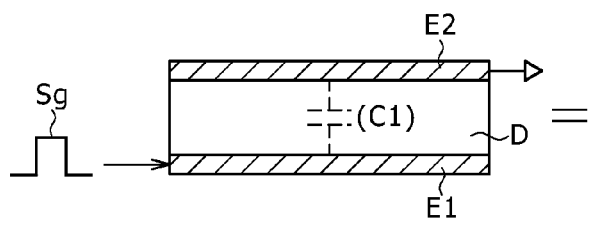
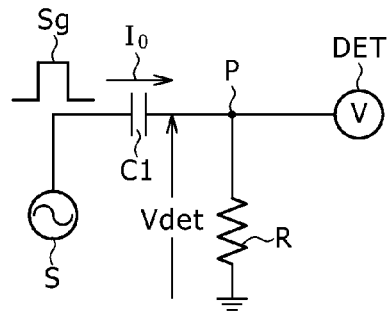
FIG.2A
FIG.2B
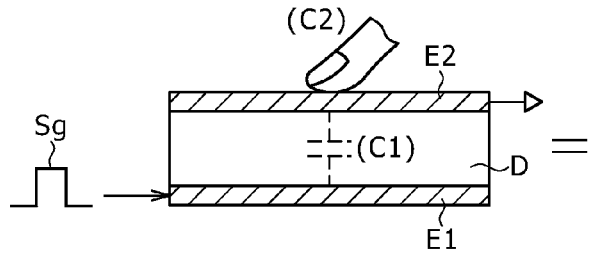
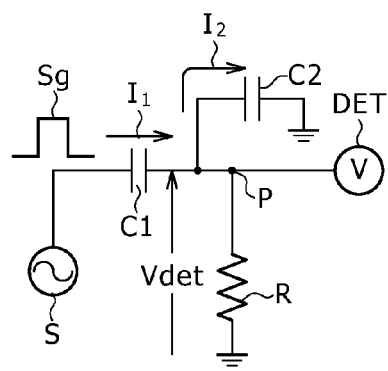
FIG.3A  Vdet
FIG.3B  Sg(Vcom)
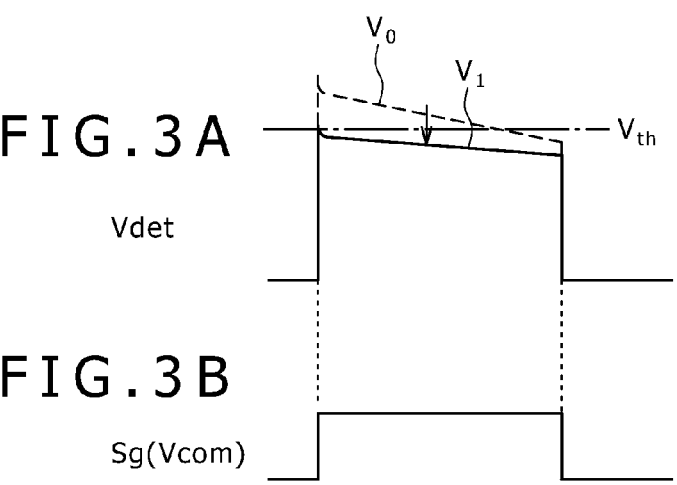

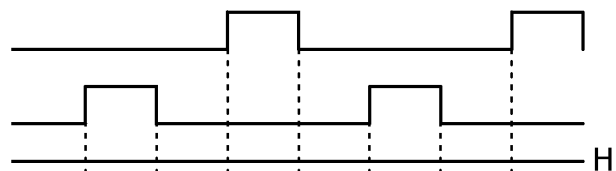

FIG.19A CLK
FIG.19B XCLK
FIG.19C UD
FIG.19D UDB
FIG.19E VG(2)
FIG.19F Vlat(50(3))
FIG.19G VG(3)
FIG.19H Vlat(50(4))
FIG.19I VG(4)

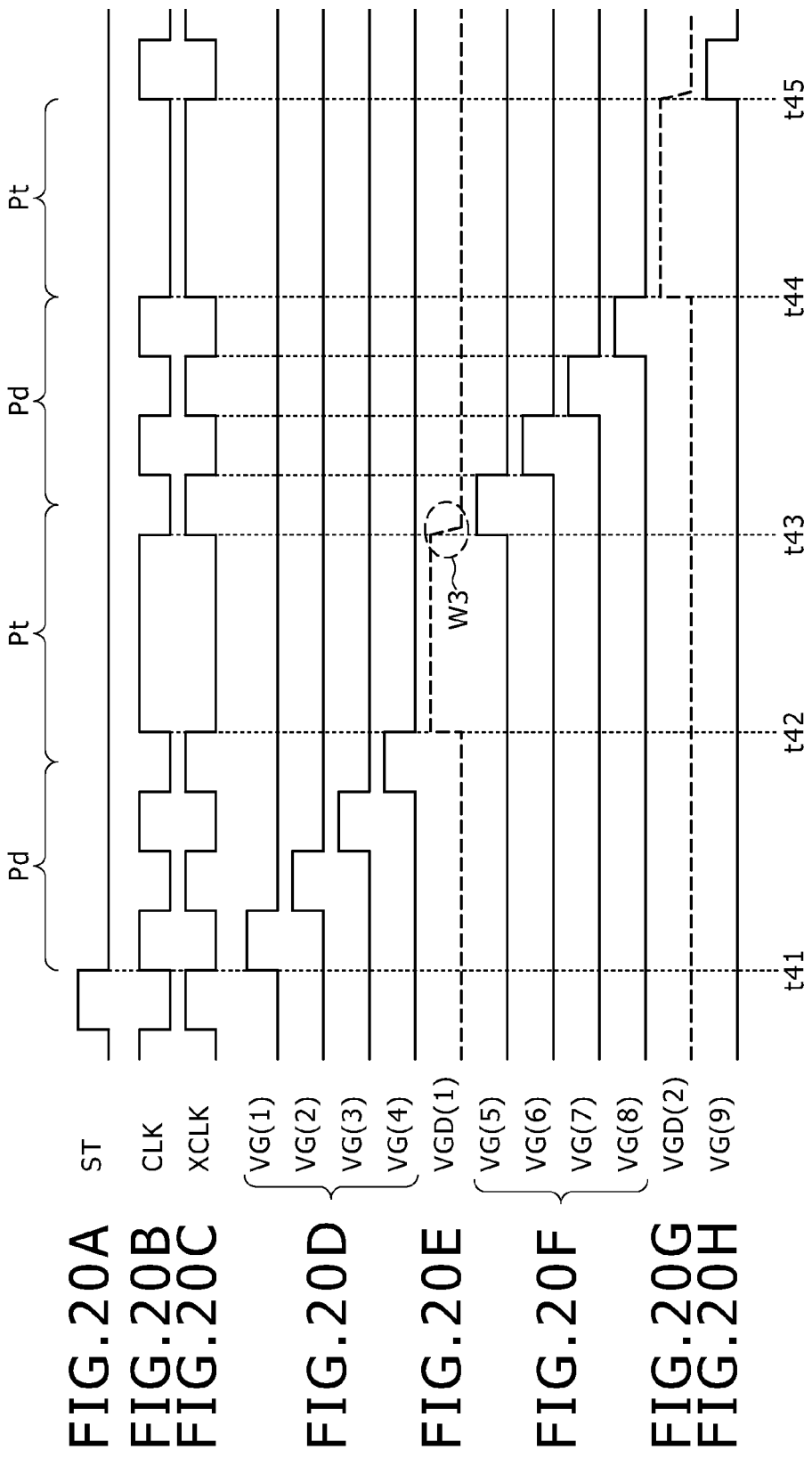

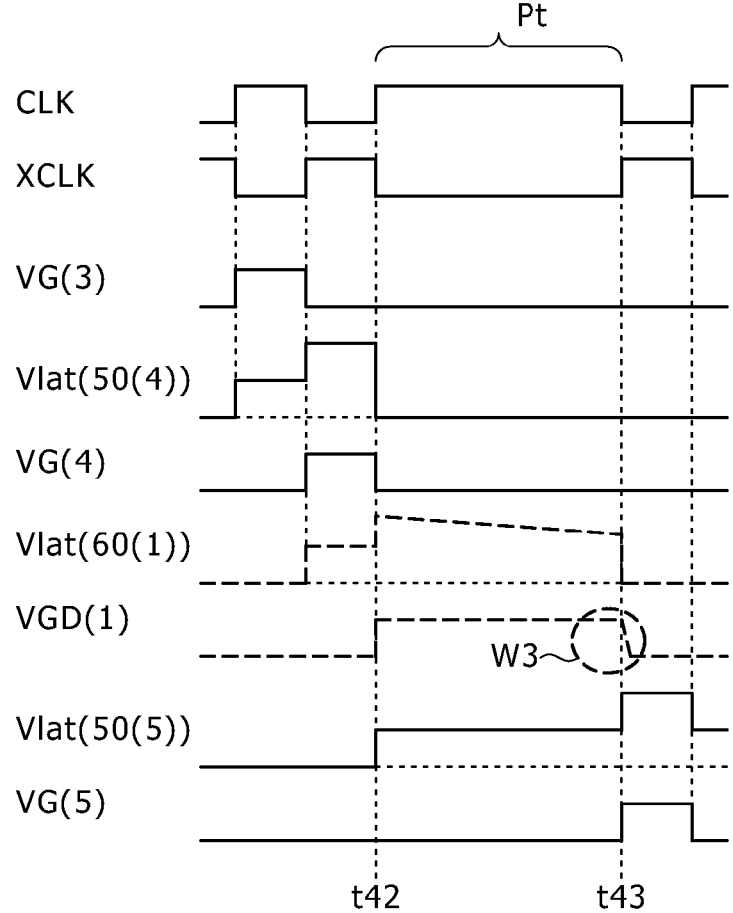

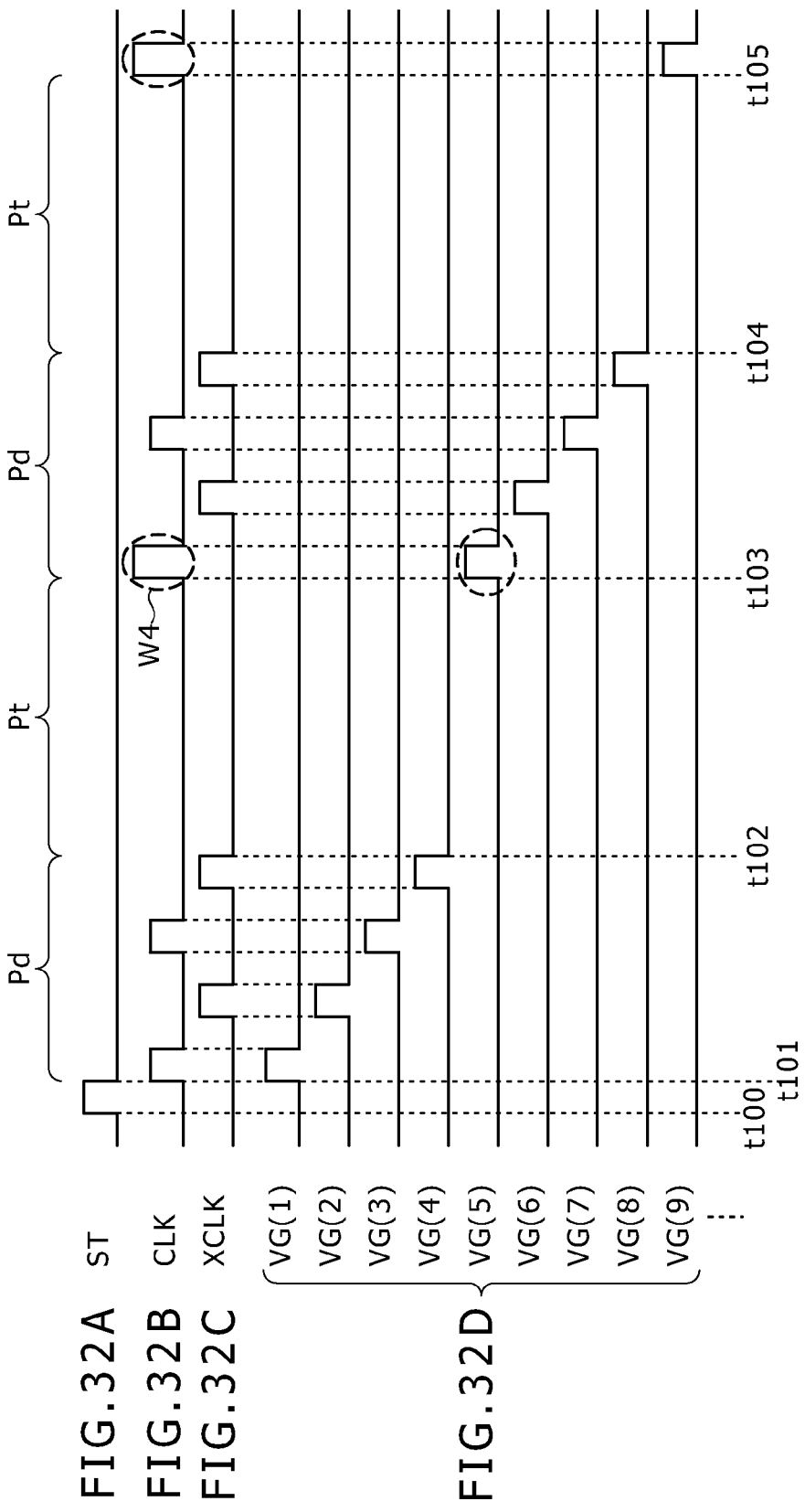

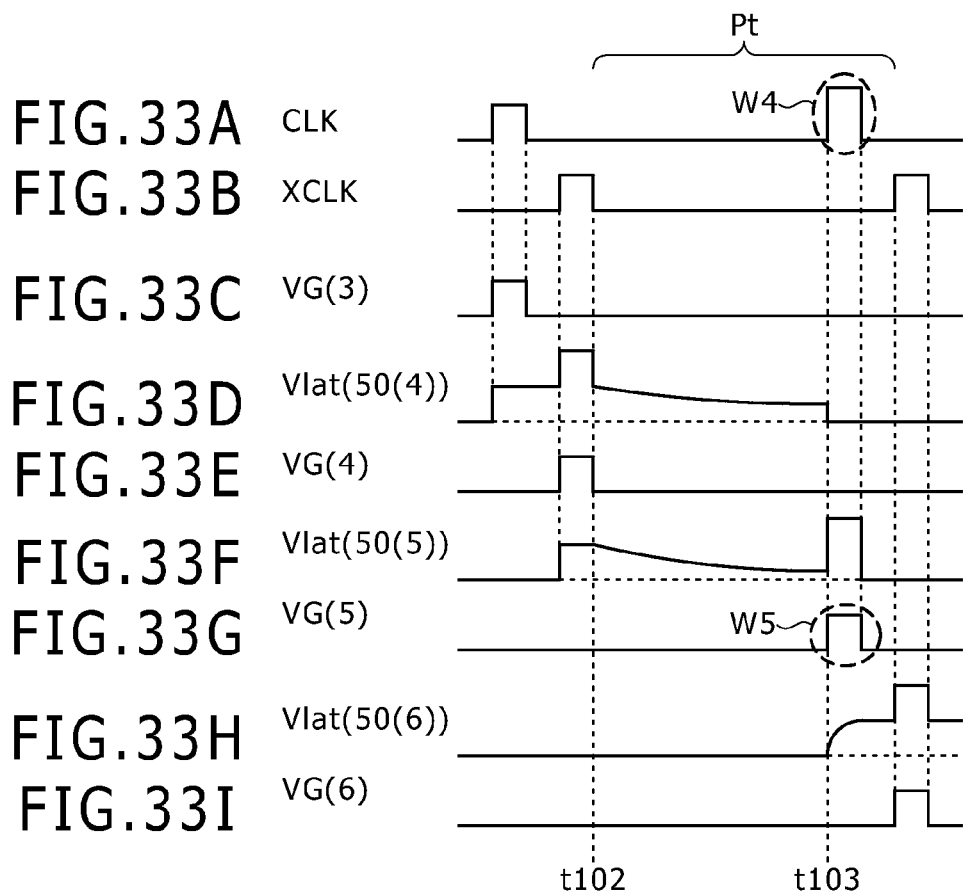
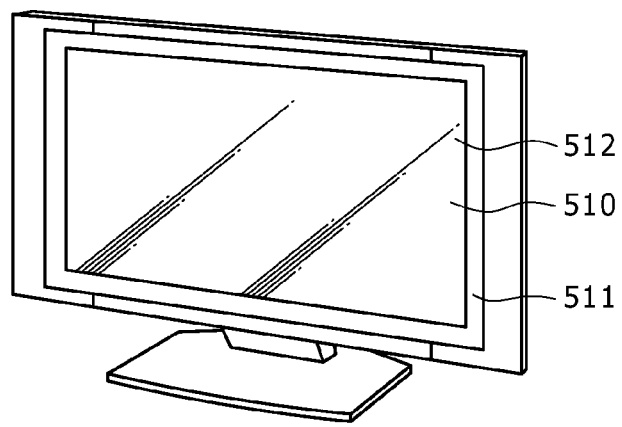
FIG.34

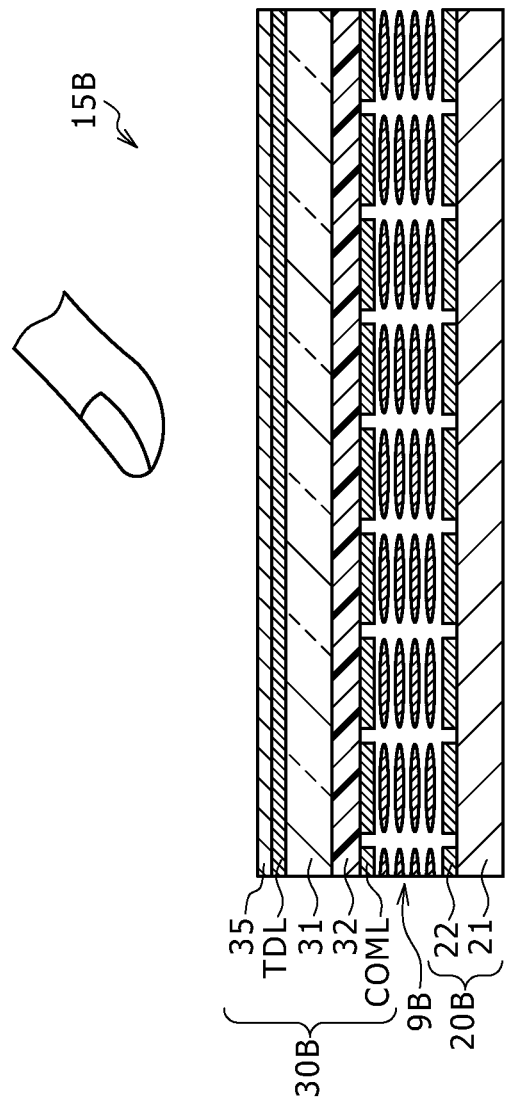

DISPLAY DEVICE, DISPLAY METHOD, AND ELECTRONIC DEVICE

BACKGROUND

The present disclosure relates to a display device and a display method for displaying an image, and an electronic device including such a display device.

Display devices of various kinds, such as liquid crystal display devices, plasma display devices, organic EL display devices, and the like, have recently been developed from viewpoints of image quality, power consumption, and the like, and are applied to various electronic devices including not only stationary type display devices but also portable telephones, portable type information terminals, and the like according to the characteristics of these display devices.

A display device generally displays an image by performing line-sequential scanning. Specifically, in a liquid crystal display device, for example, a scanning line driving circuit (gate driver) first selects one row (one horizontal line) of pixels arranged in the form of a matrix as an object of display driving. A signal line driving circuit (source driver) then supplies a pixel signal to the selected pixels. The pixel signal is thereby written to the pixels of the selected horizontal line. The display device displays an image by performing such a pixel signal writing operation while performing sequential scanning over an entire display surface.

Various techniques have been proposed for such display devices. Japanese Patent Laid-Open No. 2007-140512, for example, discloses a liquid crystal display device in which a contrivance is applied to a gate driver.

SUMMARY

There are cases where a display device performs line-sequential scanning intermittently by repeating interruption and resumption of the line-sequential scanning when performing the line-sequential scanning over an entire display surface. There is a desire to suppress degradation in image quality even in such cases.

The present disclosure has been made in view of such a problem. It is desirable to provide a display device, a display method, and an electronic device that can suppress degradation in image quality even in a case where line-sequential scanning is performed by repeating interruption and resumption of the line-sequential scanning.

A display device according to an embodiment of the present disclosure includes a display section and a scanning section. The display section has a plurality of scanning signal lines to which respective scanning signals are applied. The display section performs line-sequential scanning by repeating interruption and resumption of the line-sequential scanning on a basis of the plurality of scanning signals, and displays an image. The scanning section generates the plurality of scanning signals such that transition times on a pulse termination side of the respective scanning signals are equal to each other.

A display method according to an embodiment of the present disclosure includes: generating a plurality of scanning signals such that transition times on a pulse termination side of the respective scanning signals are equal to each other, and applying the plurality of scanning signals to a plurality of scanning signal lines; and performing line-sequential scanning by repeating interruption and resumption of the line-sequential scanning on a basis of the plurality of scanning signals, and displaying an image.

An electronic device according to an embodiment of the present disclosure includes a display device; and a control section configured to perform operation control using the display device; the display device including a display section configured to have a plurality of scanning signal lines to which respective scanning signals are applied, the display section performing line-sequential scanning by repeating interruption and resumption of the line-sequential scanning on a basis of the plurality of scanning signals, and displaying an image, and a scanning section configured to generate the plurality of scanning signals such that transition times on a pulse termination side of the respective scanning signals are equal to each other. The electronic device corresponds to for example a television device, a digital camera, a personal computer, a video camera, or a portable terminal device such as a portable telephone or the like.

In the display device, the display method, and the electronic device according to the embodiments of the present disclosure, line-sequential operation is performed by repeating interruption and resumption of the line-sequential operation on a basis of a plurality of scanning signals, whereby an image is displayed. In doing so, the plurality of scanning signals are generated such that transition times on a pulse termination side of the respective scanning signals are equal to each other.

According to the display device, the display method, and the electronic device according to the embodiments of the present disclosure, the plurality of scanning signals are generated such that transition times on a pulse termination side of the respective scanning signals are equal to each other. Thus, even in a case where line-sequential scanning is performed by repeating interruption and resumption of the line-sequential scanning, degradation in image quality can be suppressed.

BRIEF DESCRIPTION OF THE DRAWINGS

FIGS. 1A and 1B are diagrams of assistance in explaining basic principles of a touch detecting system in a display device according to an embodiment of the present disclosure, and are diagrams showing a state of no finger being in contact or in proximity;

FIGS. 2A and 2B are diagrams of assistance in explaining the basic principles of the touch detecting system in the display device according to the embodiment of the present disclosure, and are diagrams showing a state of a finger being in contact or in proximity;

FIGS. 3A and 3B are diagrams of assistance in explaining the basic principles of the touch detecting system in the display device according to the embodiment of the present disclosure, and are diagrams showing an example of the waveforms of a driving signal and a touch detection signal;

FIGS. 10A, 10B, 10C, 10D, 10E, 10F, 10G, 10H, and 10I are timing waveform charts showing an example of operation of the transfer circuit shown in FIG. 8;

FIGS. 19A, 19B, 19C, 19D, 19E, 19F, 19G, 19H, and 19I are timing waveform charts showing an example of operation of transfer circuits in a gate driver according to an example of modification of the first embodiment;

FIGS. 20A, 20B, 20C, 20D, 20E, 20F, 20G, and 20H are timing waveform charts showing an example of operation of the gate driver according to the example of modification of the first embodiment;

FIGS. 21A, 21B, 21C, 21D, 21E, 21F, 21G, 21H, and 21I are timing waveform charts showing the example of operation of the gate driver according to the example of modification of the first embodiment in more detail;

FIGS. 32A, 32B, 32C, and 32D are timing waveform charts showing an example of operation of the gate driver shown in FIG. 31;

FIGS. 33A, 33B, 33C, 33D, 33E, 33F, 33G, 33H, and 33I are timing waveform charts showing the example of operation of the gate driver shown in FIG. 31 in more detail;

FIG. 34 is a perspective view of an external constitution of a television device to which a display device according to an embodiment is applied; and FIG. 35 is a sectional view of a general sectional structure of a display section equipped with a touch sensor according to an example of modification.

DETAILED DESCRIPTION OF THE PREFERRED EMBODIMENTS

Figure 4:
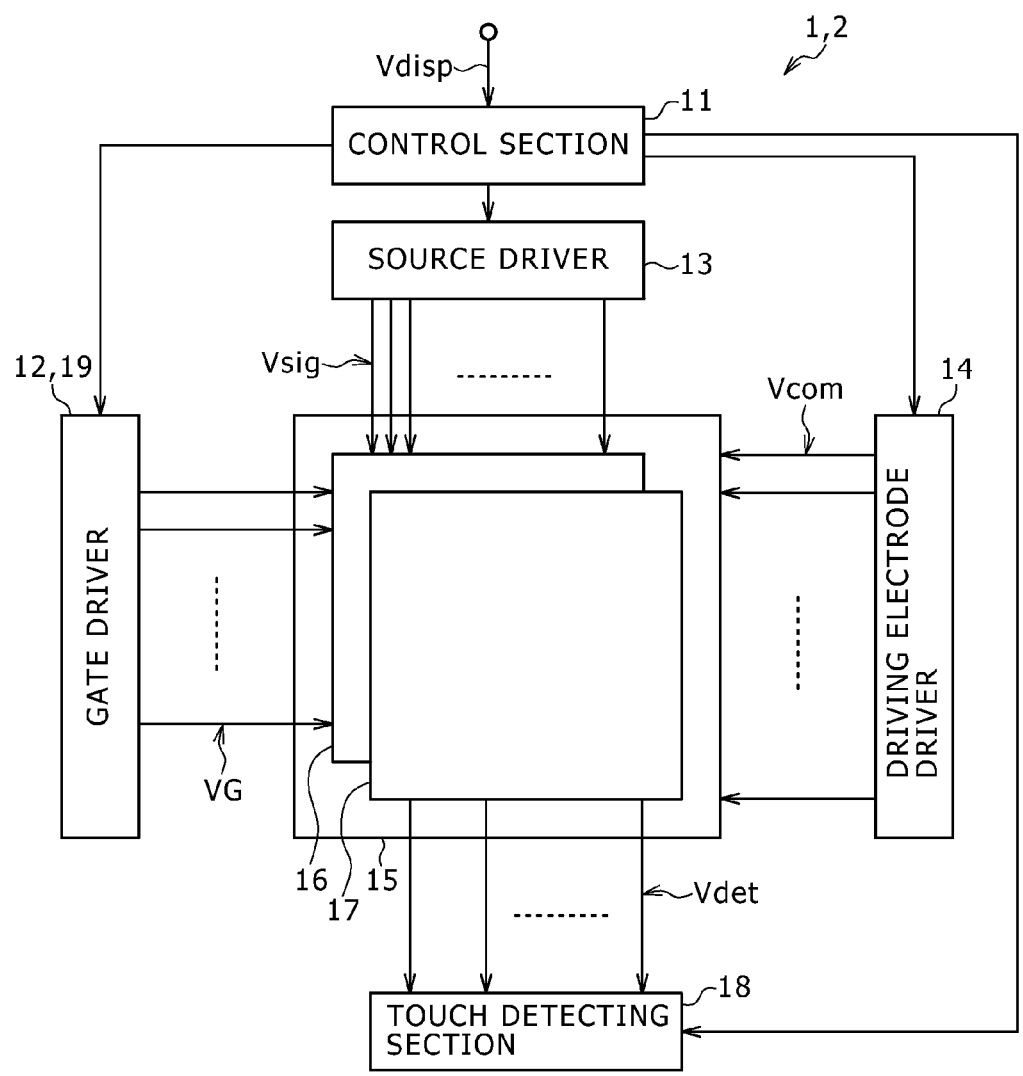
FIG. 4 is a block diagram showing an example of configuration of a display device according to an embodiment of the present disclosure.

Preferred embodiments of the present disclosure will hereinafter be described in detail with reference to the drawings. Incidentally, description will be made in the following order.

1. Basic Principles of Capacitance Type Touch Detection
2. First Embodiment
3. Second Embodiment
4. Examples of Application <1. Basic Principles of Capacitance Type Touch Detection>

The basic principles of touch detection in a display panel according to an embodiment of the present disclosure will first be described with reference to FIGS. 1A to 3B. A present touch detecting system is embodied as a capacitance type touch sensor. As shown in FIG. 1A, for example, a capacitance element is formed by using a pair of electrodes (a driving electrode E1 and a touch detecting electrode E2) arranged so as to be opposed to each other with a dielectric D sandwiched between the pair of electrodes. This structure is represented as an equivalent circuit shown in FIG. 1B. The driving electrode E1, the touch detecting electrode E2, and the dielectric D form the capacitance element C1. One terminal of the capacitance element C1 is connected to an alternating-current signal source (driving signal source) S. Another terminal P of the capacitance element C1 is grounded via a resistor R, and is connected to a voltage detector (touch detecting circuit) DET. When an alternating-current rectangular wave Sg (FIG. 3B) of a predetermined frequency (a few kHz to a few ten kHz) is applied from the alternating-current signal source S to the driving electrode E1 (one terminal of the capacitance element C1), an output waveform (touch detection signal Vdet) as shown in FIG. 3A appears at the touch detecting electrode E2 (the other terminal P of the capacitance element C1). Incidentally, this alternating-current rectangular wave Sg corresponds to an alternating-current driving signal VcomAC to be described later.

In a state of no finger being in contact with (or in proximity to) the touch detecting electrode E2, as shown in FIG. 1B, a current $I_0$ corresponding to the capacitance value of the capacitance element C1 flows as the capacitance element C1 is charged and discharged. The other terminal P of the capacitance element C1 at this time has a potential waveform such as a waveform $V_0$ in FIG. 3A, for example. This waveform is detected by the voltage detector DET.

On the other hand, in a state of a finger being in contact with (or in proximity to) the touch detecting electrode E2, as shown in FIG. 2B, a capacitance element C2 formed by the finger is added in series with the capacitance element C1. In this state, as the capacitance elements C1 and C2 are charged and discharged, respective currents $I_1$ and $I_2$ flow. The other terminal P of the capacitance element C1 at this time has a potential waveform such as a waveform $V_1$ in FIG. 3A, for example. This waveform is detected by the voltage detector DET. At this time, the potential of the point P is a divided-voltage potential determined by the values of the currents $I_1$ and $I_2$ flowing through the capacitance elements C1 and C2. The waveform $V_1$ therefore has a smaller value than the waveform $V_0$ in the noncontact state. The voltage detector DET compares the detected voltage with a predetermined threshold voltage $V_{th}$. When the detected voltage is equal to or higher than the threshold voltage, the voltage detector DET determines that the touch detecting electrode E2 is in a noncontact state. When the detected voltage is lower than the threshold voltage, the voltage detector DET determines that the touch detecting electrode E2 is in a contact state. A touch detection can be thus performed.

<2. First Embodiment>
Example of Configuration
Example of General Configuration

FIG. 4 shows an example of configuration of a display device according to a first embodiment. This display panel 1 is a display device of a so-called in-cell type in which a liquid crystal display panel and a capacitance type touch panel are integrated with each other.

This display device 1 includes a control section 11, a gate driver 12, a source driver 13, a driving electrode driver 14, a display section 15 equipped with a touch sensor, and a touch detecting section 18.

The control section 11 is a circuit for supplying a control signal to each of the gate driver 12, the source driver 13, the driving electrode driver 14, and the touch detecting section 18 on a basis of a video signal Vdisp, and thereby performing control so that the gate driver 12, the source driver 13, the driving electrode driver 14, and the touch detecting section 18 operate in synchronism with each other.

The gate driver 12 has a function of sequentially selecting one horizontal line as an object of display driving in the display section 15 equipped with the touch sensor on the basis of the control signal supplied from the control section 11. Specifically, as will be described later, the gate driver 12 sequentially selects one row (one horizontal line) of pixels Pix formed in the form of a matrix in a liquid crystal display section 16 (to be described later) of the display section 15 equipped with the touch sensor by supplying a scanning signal VG to the display section 15 equipped with the touch sensor.

The source driver 13 is a circuit for supplying a pixel signal Vsig to each of the pixels Pix (to be described later) of the liquid crystal display section 16 on the basis of the control signal supplied from the control section 11. Specifically, as will be described later, the source driver 13 supplies the pixel signal Vsig to each of pixels Pix forming one horizontal line selected as an object of display driving.

The driving electrode driver 14 is a circuit for supplying driving electrodes COML (to be described later) of the display section 15 equipped with the touch sensor with a driving signal Vcom on the basis of the control signal supplied from the control section 11. Specifically, as will be described later, the driving electrode driver 14 sequentially applies an alternating-current driving signal VcomAC (to be described later) to driving electrodes COML as an object of touch detection driving on a time-division basis, and applies a direct-current driving signal VcomDC (to be described later) to the other driving electrodes COML.

The display section 15 equipped with the touch sensor is a display section including a touch sensor. The display section 15 equipped with the touch sensor has the liquid crystal display section 16 and a touch sensor section 17. The liquid crystal display section 16 makes display by sequentially scanning horizontal lines one at a time according to the scanning signal VG supplied from the gate driver 12. The touch sensor section 17 operates on the basis of the above-described basic principles of capacitance type touch detection. The touch sensor section 17 outputs a touch detection signal Vdet according to the alternating-current driving signal VcomAC supplied from the driving electrode driver 14. The touch sensor section 17 thereby performs sequentially scanning and performs touch detection.

The touch detecting section 18 detects an external adjacent object on the basis of the control signal supplied from the control section 11 and the touch detection signal Vdet supplied from the touch sensor section 17.

With this configuration, the display device 1 performs touch detecting operation while performing display operation on the basis of the video signal Vdisp. In doing so, as will be described later, the display device 1 performs the display operation by performing line-sequential scanning intermittently while repeating interruption and resumption of the line-sequential scanning, and performs the touch detecting operation in a period during which the display operation is interrupted.

(Display Section 15 Equipped with Touch Sensor)

An example of constitution of the display section 15 equipped with the touch sensor will next be described in detail.

Figure 5:
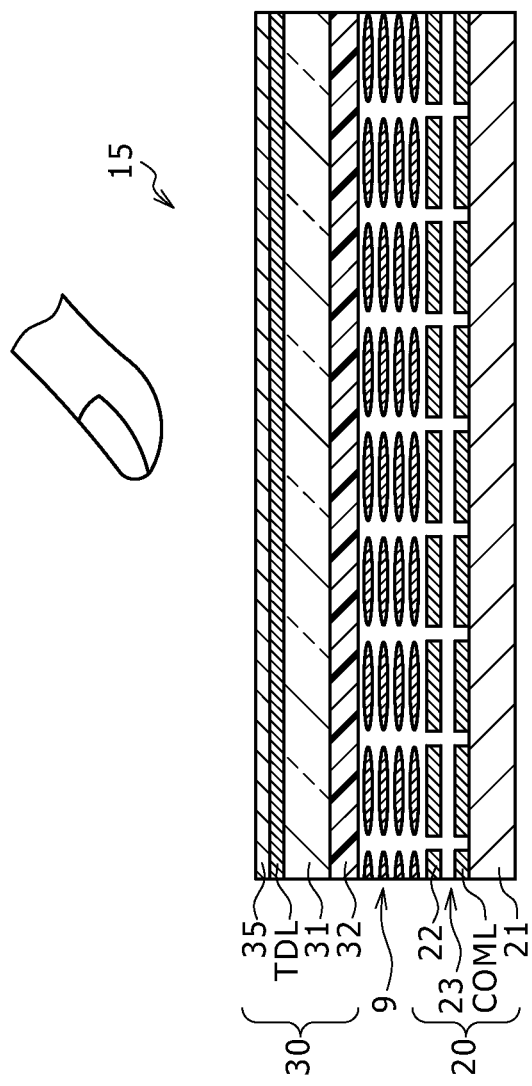
FIG. 5 is a sectional view of a general sectional structure of a display section equipped with a touch sensor shown in FIG. 4.

FIG. 5 shows an example of a sectional structure of principal parts of the display section 15 equipped with the touch sensor. The display section 15 equipped with the touch sensor includes a pixel substrate 20, a counter substrate 30 disposed so as to be opposed to the pixel substrate 20, and a liquid crystal layer 9 inserted between the pixel substrate 20 and the counter substrate 30.

The pixel substrate 20 has a TFT substrate 21 as a circuit substrate, the driving electrodes COML, and pixel electrodes 22. The TFT substrate 21 functions as a circuit substrate on which various kinds of electrodes and wiring (pixel signal lines SGL, scanning signal lines GCL, and the like to be described later), thin film transistors (TFTs), and the like are formed. The TFT substrate 21 is formed by glass, for example. The driving electrodes COML are formed on the TFT substrate 21. The driving electrodes COML are electrodes for supplying a common voltage to a plurality of pixels Pix (to be described later). The driving electrodes COML function as a common driving electrode for liquid crystal display operation, and also function as driving electrodes for touch detecting operation. An insulating layer 23 is formed on the driving electrodes COML. The pixel electrodes 22 are formed on the insulating layer 23. The pixel electrodes 22 are electrodes for supplying pixel signals for making display, and have a light transmitting property. The driving electrodes COML and the pixel electrodes 22 are formed by ITO (Indium Tin Oxide), for example.

The counter substrate 30 has a glass substrate 31, a color filter 32, and a touch detecting electrode TDL. The color filter 32 is formed on one surface of the glass substrate 31. This color filter 32 is formed by periodically arranging color filter layers of three colors of red (R), green (G), and blue (B), for example. The three colors of R, G, and B are associated as one set with each display pixel. The touch detecting electrode TDL is formed on another surface of the glass substrate 31. The touch detecting electrode TDL is formed by ITO, for example, and has a light transmitting property. A polarizer 35 is disposed on the touch detecting electrode TDL.

The liquid crystal layer 9 functions as a display functional layer, and modulates light passing through the liquid crystal layer 9 according to a state of an electric field. This electric field is formed by potential difference between the voltage of the driving electrodes COML and the voltage of the pixel electrodes 22. A liquid crystal in a transverse electric field mode such as an FFS (Fringe Field Switching) mode, an IPS (In-Plane Switching) mode, or the like is used for the liquid crystal layer 9.

Incidentally, though not shown, an alignment film is disposed between the liquid crystal layer 9 and the pixel substrate 20, an alignment film is disposed between the liquid crystal layer 9 and the counter substrate 30, and an incidence side polarizer is disposed on the undersurface side of the pixel substrate 20.

Figure 6:
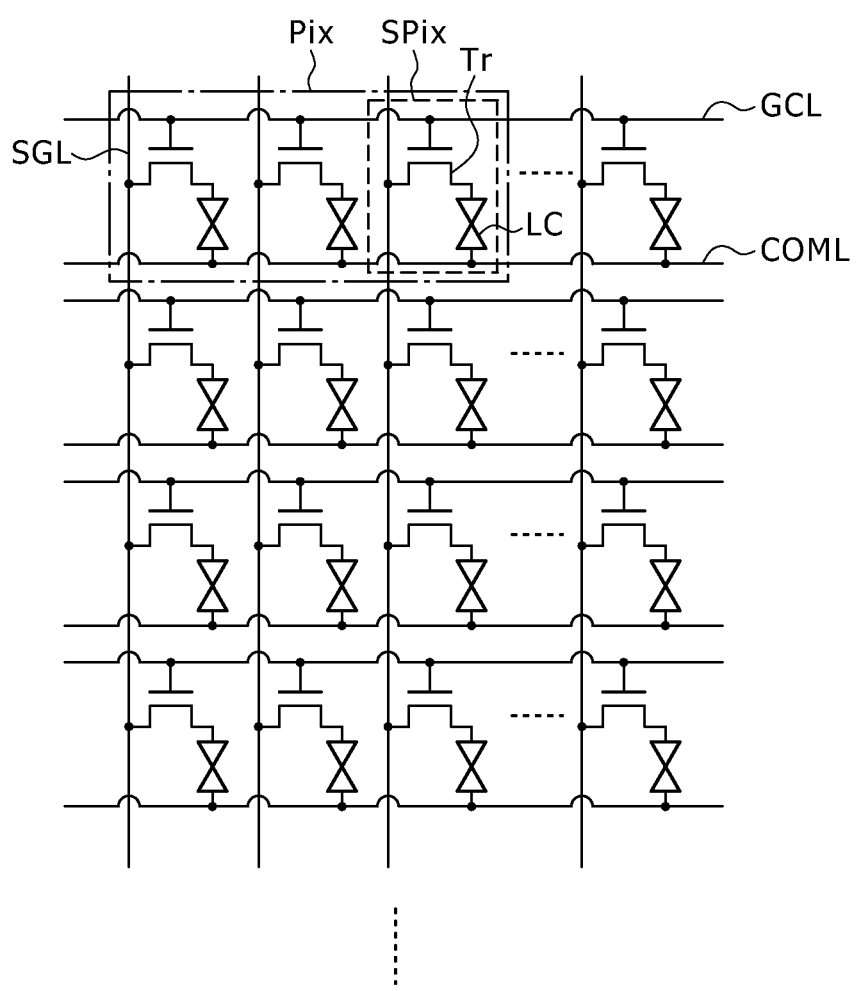
FIG. 6 is a circuit diagram showing a pixel arrangement in the display section equipped with the touch sensor shown in FIG. 4.

FIG. 6 shows an example of constitution of a pixel structure in the liquid crystal display section 16. The liquid crystal display section 16 has a plurality of pixels Pix arranged in the form of a matrix. Each of the pixels Pix is formed by three sub-pixels SPix. The three sub-pixels SPix are arranged so as to correspond to the three respective colors (RGB) of the color filter 32 shown in FIG. 5. A sub-pixel SPix has a TFT element Tr and a liquid crystal element LC. The TFT element Tr is formed by a thin film transistor. In this example, the TFT element Tr is formed by an n-channel MOS (Metal Oxide Semiconductor) type TFT. The TFT element Tr has a source connected to a pixel signal line SGL, has a gate connected to a scanning signal line GCL, and has a drain connected to one terminal of the liquid crystal element LC. The liquid crystal element LC has one terminal connected to the drain of the TFT element Tr, and has another terminal connected to a driving electrode COML.

The sub-pixel SPix and other sub-pixels SPix belonging to the same row in the liquid crystal display section 16 are connected to each other by the scanning signal line GCL. The scanning signal line GCL is connected to the gate driver 12, and is supplied with a scanning signal VG from the gate driver 12. In addition, the sub-pixel SPix and other sub-pixels SPix belonging to the same column in the liquid crystal display section 16 are connected to each other by the pixel signal line SGL. The pixel signal line SGL is connected to the source driver 13, and is supplied with a pixel signal Vsig from the source driver 13.

Further, the sub-pixel SPix and the other sub-pixels SPix belonging to the same row in the liquid crystal display section 16 are connected to each other by the driving electrode COML. The driving electrode COML is connected to the driving electrode driver 14, and is supplied with a direct-current driving signal VcomDC from the driving electrode driver 14 in display operation.

With this configuration of the liquid crystal display section 16, the gate driver 12 drives the scanning signal line GCL in such a manner as to perform line-sequential driving on a time-division basis. Thereby one horizontal line is sequentially selected. The source driver 13 supplies pixels Pix belonging to the one horizontal line with the pixel signal Vsig. Thereby display is performed in each horizontal line.

Figure 7:
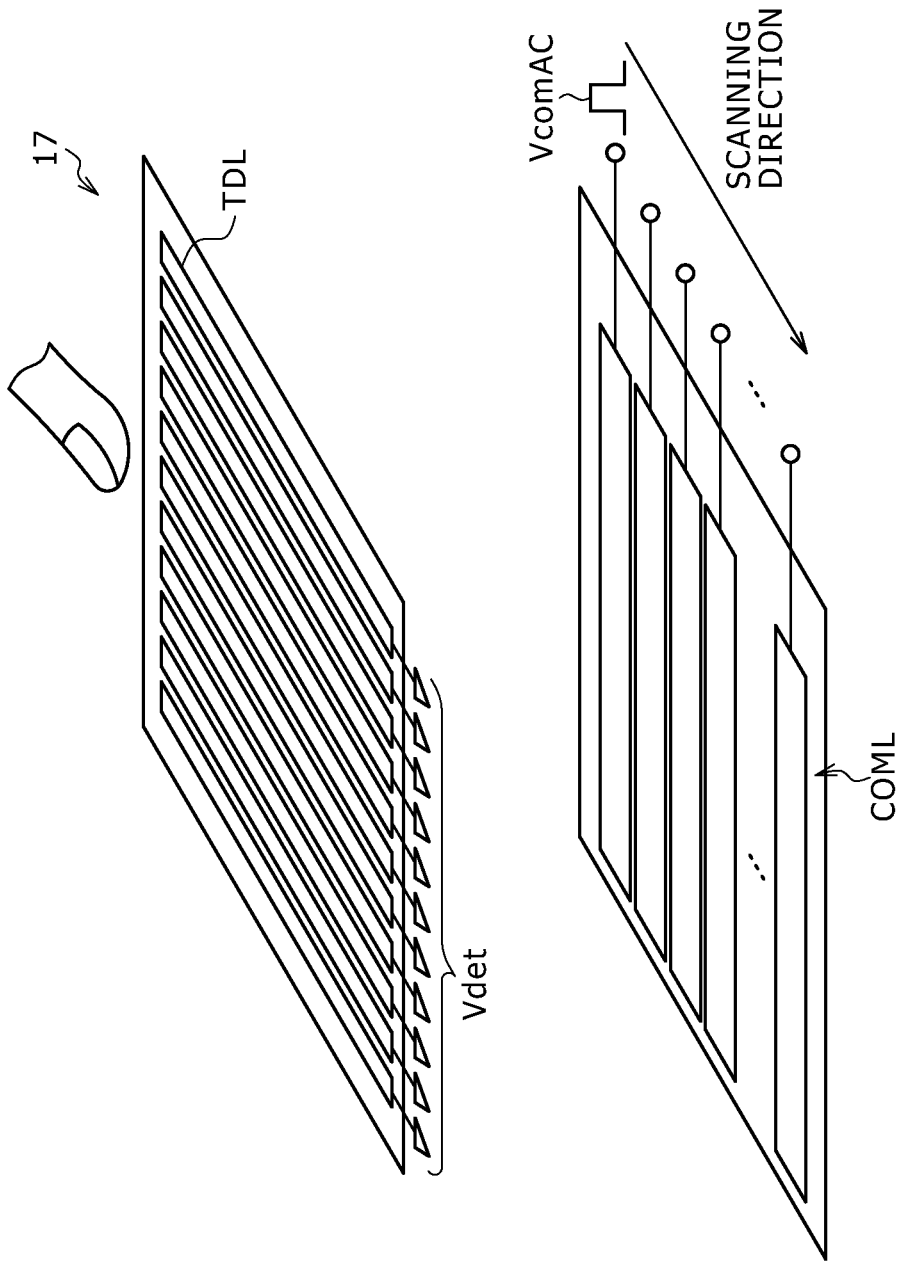
FIG. 7 is a perspective view of an example of constitution of driving electrodes and touch detecting electrodes in the display section equipped with the touch sensor shown in FIG. 4.

FIG. 7 shows in perspective an example of constitution of the touch sensor section 17. The touch sensor section 17 includes the driving electrodes COML provided to the pixel substrate 20 and the touch detecting electrodes TDL provided to the counter substrate 30. The driving electrodes COML have strip-shaped electrode patterns extending in a horizontal direction of FIG. 7. The touch detecting electrodes TDL have strip-shaped electrode patterns extending in a direction orthogonal to the extending direction of the electrode patterns of the driving electrodes COML. Each of the electrode patterns of the touch detecting electrodes TDL is connected to the touch detecting section 18. The electrode patterns of the driving electrodes COML and the touch detecting electrodes TDL which electrode patterns intersect each other form a capacitance at parts of intersection thereof.

With this constitution of the touch sensor section 17, the driving electrode driver 14 applies an alternating-current driving signal VcomAC to the driving electrodes COML. Thereby, a touch detection signal Vdet is output from the touch detecting electrodes TDL, and touch detection is performed. That is, the driving electrodes COML correspond to the driving electrode E1 in the basic principles of touch detection as shown in FIGS. 1A to 3B, the touch detecting electrodes TDL correspond to the touch detecting electrode E2, and the touch sensor section 17 detects a touch according to the basic principles. As shown in FIG. 7, the electrode patterns intersecting each other form capacitance type touch sensors in the form of a matrix. Thus, a position touched or approached by an external adjacent object can also be detected by performing scanning over the entire touch detecting surface of the touch sensor section 17.

(Gate Driver 12)

The gate driver 12 will next be described. The gate driver 12 sequentially selects one horizontal line of the liquid crystal display section 16 by performing line-sequential scanning intermittently. Specifically, in the present example, a display screen is divided into a plurality of partial display regions RD(1), RD(2), . . . in a scanning direction. The gate driver 12 performs line-sequential scanning intermittently while interrupting the scanning for each of the partial display regions RD(1), RD(2), . . . . A partial display region RD will hereinafter be used as representing an arbitrary one of the partial display regions RD(1), RD(2), . . . as appropriate.

Figure 8:
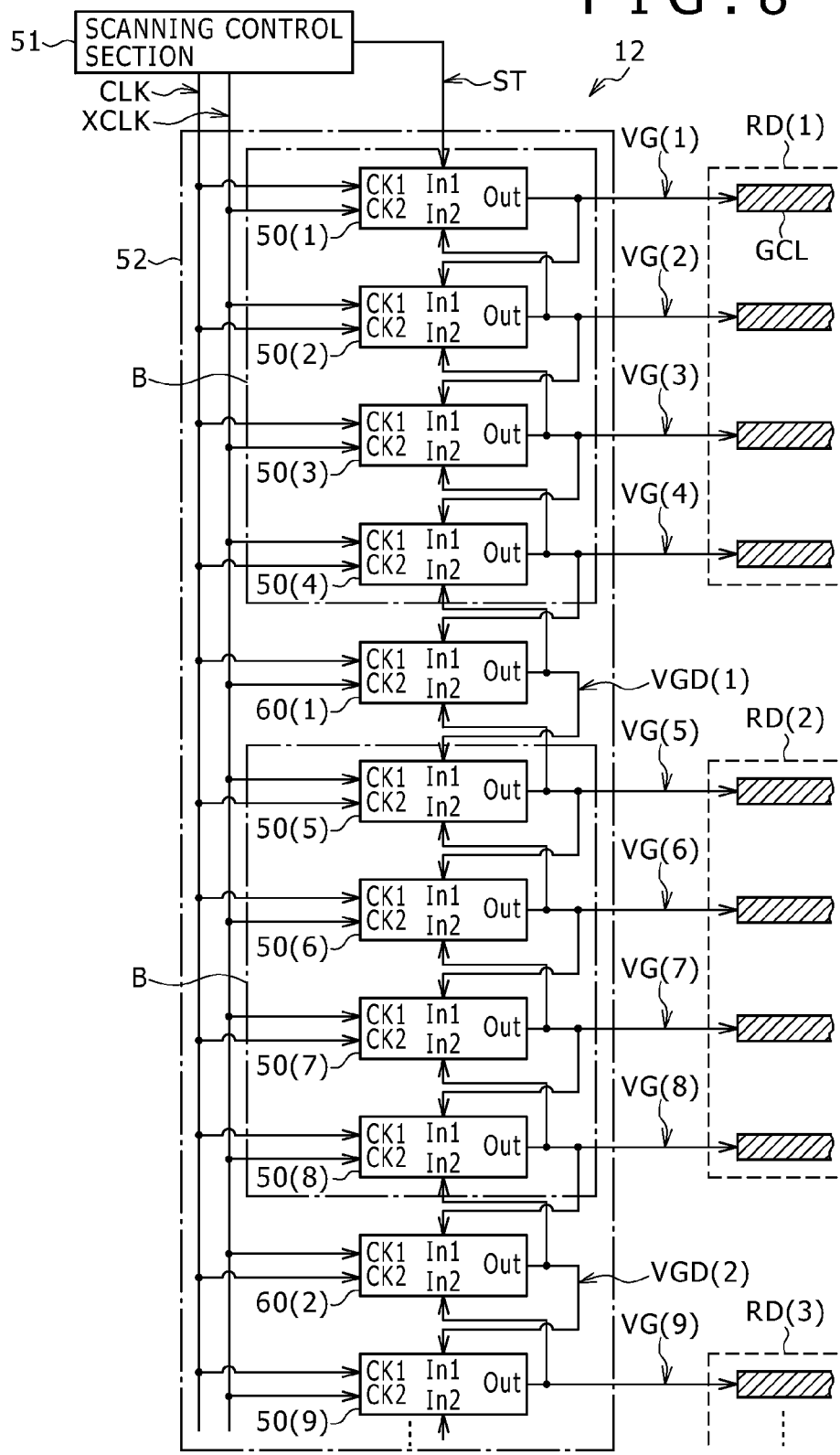
FIG. 8 is a block diagram showing an example of configuration of a gate driver according to a first embodiment.

FIG. 8 shows an example of configuration of the gate driver 12. The gate driver 12 includes a scanning control section 51 and a shift register 52.

The scanning control section 51 generates a control signal ST, clock signals CLK and XCLK, and control signals UD and UDB (not shown) on the basis of the control signal supplied from the control section 11 which control signal is not shown in FIG. 8, and supplies the control signal ST, the clock signals CLK and XCLK, and the control signals UD and UDB to the shift register 52. The control signal ST is a signal transferred in the shift register 52. The clock signals CLK and XCLK are clock signals for the shift register 52 to perform transfer operation. The control signals UD and UDB are signals for controlling the transfer direction of the signal in the shift register 52, as will be described later.

The shift register 52 generates scanning signals VG(1), VG(2), . . . to be supplied to the respective scanning signal lines GCL of the liquid crystal display section 16 on the basis of the control signal supplied from the scanning control section 51. The shift register 52 in the present example is formed by amorphous silicon on the pixel substrate 20 shown in FIG. 5. The shift register 52 has transfer circuits 50(1), 50(2), . . . and transfer circuits 60(1), 60(2), . . . .

A scanning signal VG will hereinafter be used as representing an arbitrary one of the scanning signals VG(1) and the like as appropriate. Similarly, a transfer circuit 50 will hereinafter be used as representing an arbitrary one of the transfer circuits 50(1) and the like as appropriate. A transfer circuit 60 will hereinafter be used as representing an arbitrary one of the transfer circuits 60(1) and the like as appropriate.

The transfer circuit 50 transfers an input signal in synchronism with the clock signals CLK and XCLK, and supplies an output signal (scanning signal VG) of the transfer circuit 50 to the corresponding scanning signal line GCL. The transfer circuit 60 transfers an input signal in synchronism with the clock signals CLK and XCLK. That is, unlike the transfer circuit 50, the transfer circuit 60 does not supply an output signal (signal VGD) of the transfer circuit 60 to a scanning signal line GCL, but transfers the output signal to the transfer circuit 50 in a next stage. The transfer circuit 60 in the present example has the same circuit configuration as the transfer circuit 50.

In the shift register 52, one transfer circuit 60 is inserted for every predetermined number of (four in the present example) transfer circuits 50 (transfer block B). The transfer block B is in a one-to-one correspondence with the partial display region RD. Incidentally, the number of transfer circuits 50 included in the transfer block B is four in the present example for the convenience of description, but is not limited to this, and may be any value equal to or smaller than three or equal to or larger than five.

Each of the transfer circuits 50 and 60 has input terminals CK1 and CK2, input terminals In1 and In2, input terminals UD and UDB (not shown), and an output terminal Out.

The input terminal CK1 of each of the transfer circuits 50 and 60 is supplied with one of the clock signals CLK and XCLK alternately for each transfer circuit. Specifically, for example, the input terminals CK1 of the transfer circuits 50(1), 50(3), 60(1), and the like are each supplied with the clock signal CLK, and the input terminals CK1 of the transfer circuits 50(2), 50(4), 50(5), and the like are each supplied with the clock signal XCLK. The input terminal CK2 of each of the transfer circuits 50 and 60 is supplied with a signal of the clock signals CLK and XCLK which signal is different from that input to the input terminal CK1. Specifically, for example, the input terminals CK2 of the transfer circuits 50(1), 50(3), 60(1), and the like are each supplied with the clock signal XCLK, and the input terminals CK2 of the transfer circuits 50(2), 50(4), 50(5), and the like are each supplied with the clock signal CLK.

In the example of FIG. 8, the input terminal In1 of each of the transfer circuits 50 and 60 is supplied with the output signal of the transfer circuit 50 or the transfer circuit 60 on the upper side of the transfer circuit 50 or 60 of interest. The input terminal In2 of each of the transfer circuits 50 and 60 is supplied with the output signal of the transfer circuit 50 or the transfer circuit 60 on the lower side of the transfer circuit 50 or 60 of interest.

Each of the transfer circuits 50 and 60 outputs the signal input to the input terminal In1 or the input terminal In2 from the output terminal Out in synchronism with the clock signals CLK and XCLK. The transfer circuit 60 supplies the output signal (signal VGD) to the adjacent transfer circuits 50. The transfer circuit 50 supplies the output signal (scanning signal VG) to the adjacent transfer circuits 50 or the adjacent transfer circuits 50 and 60, and supplies the output signal (scanning signal VG) to the scanning signal line GCL of the liquid crystal display section 16.

Figure 9:
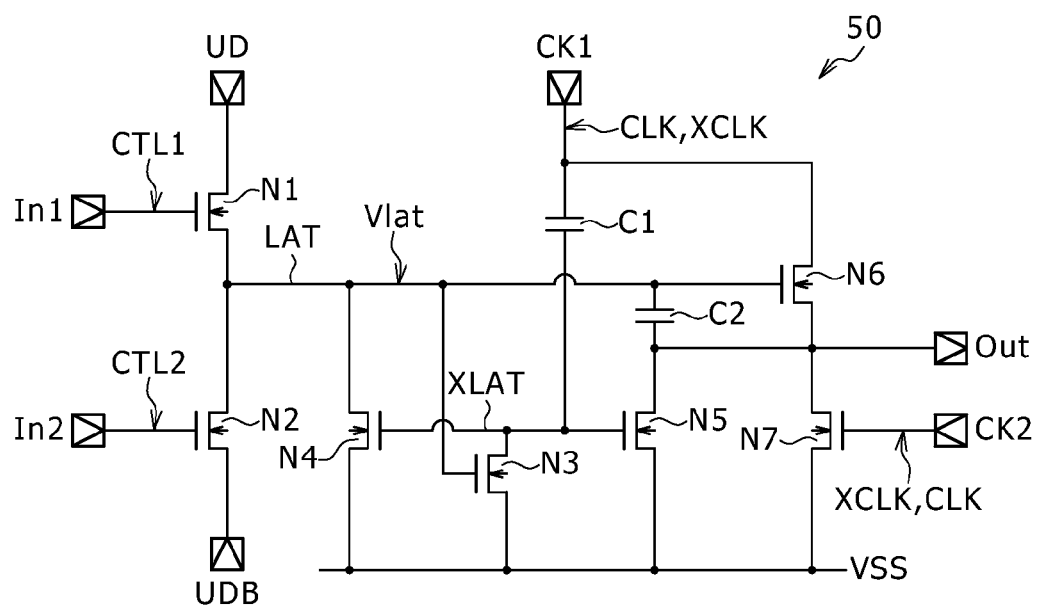
FIG. 9 is a circuit diagram showing an example of configuration of a transfer circuit shown in FIG. 8.

FIG. 9 shows an example of configuration of the transfer circuit 50. The transfer circuit 50 has transistors N1 to N7 and capacitance elements C1 and C2. The transistors N1 to N7 are n-channel MOS type transistors. The transistor N1 has a gate connected to the input terminal In1, has a source connected to the input terminal UD, and has a drain connected to a node LAT. The transistor N2 has a gate connected to the input terminal In2, has a source connected to the input terminal UDB, and has a drain connected to the node LAT. The transistor N3 has a gate connected to the node LAT, has a drain connected to a node XLAT, and has a source supplied with a power supply voltage VSS. The transistor N4 has a gate connected to the node XLAT, has a drain connected to the node LAT, and has a source supplied with the power supply voltage VSS. The transistor N5 has a gate connected to the node XLAT, has a drain connected to the output terminal Out, and has a source supplied with the power supply voltage VSS. The transistor N6 has a gate connected to the node LAT, has a drain connected to the input terminal CK1, and has a source connected to the output terminal Out. The transistor N7 has a gate connected to the input terminal CK2, has a drain connected to the output terminal Out, and has a source supplied with the power supply voltage VSS. The capacitance element C1 has one terminal connected to the input terminal CK1, and has another terminal connected to the node XLAT. The capacitance element C2 has one terminal connected to the node LAT, and has another terminal connected to the output terminal Out.

With such a configuration, the shift register 52 transfers a signal supplied from a transfer circuit in a preceding stage to a transfer circuit in a succeeding stage. In doing so, the shift register 52 can transfer the signal in both directions. Specifically, the shift register 52 has a transfer mode MA for transferring the signal from a top to a bottom in FIG. 8 and a transfer mode MB for transferring the signal from the bottom to the top in FIG. 8. The operation of the shift register 52 in the transfer mode MA will be described in the following. In the transfer mode MA, as shown in FIG. 8, the control signal ST is supplied to the input terminal In1 of the uppermost transfer circuit 50(1).

FIGS. 10A to 10I show an example of operation of the shift register 52. In the present example, the operation of the third and fourth transfer circuits 50(3) and 50(4) in the shift register 52 is shown. FIG. 10A shows the waveform of the clock signal CLK. FIG. 10B shows the waveform of the clock signal XCLK. FIG. 10C shows the waveform of the control signal UD. FIG. 10D shows the waveform of the control signal UDB. FIG. 10E shows the waveform of the scanning signal VG(2) as a signal input to the transfer circuit 50(3). FIG. 10F shows the waveform of voltage Vlat of the node LAT in the transfer circuit 50(3). FIG. 10G shows the waveform of the scanning signal VG(3) as the output signal of the transfer circuit 50(3). FIG. 10H shows the waveform of voltage Vlat of the node LAT in the transfer circuit 50(4). FIG. 10I shows the waveform of the scanning signal VG(4) as the output signal of the transfer circuit 50(4).

In the present example, pulses appear in the clock signals CLK and XCLK alternately. The control signal UD is a high-level logic signal. The control signal UDB is a low-level logic signal.

The operation of the third transfer circuit 50(3) will first be described.

First, in timing t1, the scanning signal VG(2) is input from the second transfer circuit 50(2) to the input terminal In1 (FIG. 10E). Specifically, in timing t1, the clock signal XCLK rises (FIG. 10B), and the scanning signal VG(2) rises in synchronism with the rising of the clock signal XCLK (FIG. 10E). Thereby, in the third transfer circuit 50(3), the transistor N1 is set in an on state, and the voltage Vlat of the node LAT is changed to the same level as the voltage of the control signal UD (FIG. 10F).

Next, in timing t2, the clock signal XCLK falls (FIG. 10B), and the scanning signal VG(2) falls in synchronism with the falling of the clock signal XCLK (FIG. 10E). Thereby, in the transfer circuit 50(3), the node LAT is set in a high-impedance state, and the voltage Vlat of the node LAT is maintained (FIG. 10F).

Next, in timing t3, the clock signal CLK rises (FIG. 10A). Thereby, in the transfer circuit 50(3), a current flows through the transistor N6, and the scanning signal VG(3) as the voltage of the output terminal Out rises (FIG. 10G). At this time, because of the high-impedance state of the node LAT, a voltage across the capacitance element C2 is maintained, so that the voltage Vlat rises due to a so-called bootstrap operation (FIG. 10F). The gate voltage of the transistor N6 thereby becomes sufficiently high. The transfer circuit 50(3) can therefore raise the scanning signal VG(3) to a same voltage level as the high level of the clock signal CLK (FIG. 10G).

Next, in timing t4, the clock signal CLK falls (FIG. 10A). Thereby, in the transfer circuit 50(3), the scanning signal VG(3) as the voltage of the output terminal Out falls (FIG. 10G), and the voltage Vlat is also lowered by an amount by which the voltage Vlat rose due to the bootstrap operation (FIG. 10F).

Then, in timing t5, the clock signal XCLK rises (FIG. 10B). Thereby, in the third transfer circuit 50(3), the transistor N7 is set in an on state, and the voltage Vlat of the node LAT falls (FIG. 10F).

The operation of the fourth transfer circuit 50(4) will next be described.

First, in timing t3, when the scanning signal VG(3) rises (FIG. 10G), in the transfer circuit 50(4), the transistor N1 is set in an on state, and the voltage Vlat of the node LAT is changed to the same level as the voltage of the control signal UD (FIG. 10H).

Next, in timing t4, when the scanning signal VG(3) falls (FIG. 10G), in the transfer circuit 50(4), the node LAT is set in a high-impedance state, and the voltage Vlat of the node LAT is maintained (FIG. 10H).

Next, in timing t5, when the clock signal XCLK rises (FIG. 10B), in the transfer circuit 50(4), as in the case of the transfer circuit 50(3), the voltage Vlat of the node LAT rises due to a bootstrap operation (FIG. 10H), and the scanning signal VG(4) rises (FIG. 10I).

Next, in timing t6, when the clock signal XCLK falls (FIG. 10B), in the transfer circuit 50(4), the scanning signal VG(4) as the voltage of the output terminal Out falls (FIG. 10I), and the voltage Vlat is also lowered by an amount by which the voltage Vlat rose due to the bootstrap operation (FIG. 10H).

Next, in timing t7, when the clock signal CLK rises (FIG. 10A), in the transfer circuit 50(4), the transistor N7 is set in an on state, and the voltage Vlat of the node LAT falls (FIG. 10H).

Thus, the transfer circuits 50 and 60 transfer a signal supplied from a transfer circuit in a preceding stage to a transfer circuit in a succeeding stage by so-called dynamic operation.

In the present example, the transfer mode MA for transferring a signal from the top to the bottom of FIG. 8 has been described. However, similar operation is performed in the transfer mode MB for transferring a signal from the bottom to the top of FIG. 8. In this case, the control signal ST is supplied to the input terminal In2 of the lowermost transfer circuit (not shown). That is, in the transfer mode MA, the control signal ST is supplied to the input terminal In1 of the uppermost transfer circuit 50(1), whereas in the transfer mode MB, the control signal ST is supplied to the input terminal In2 of the lowermost transfer circuit 50. In addition, in this transfer mode MB, the control signal UD is set at a low level, and the control signal UDB is set at a high level. Each of the transfer circuits 50 and 60 thereby transfers a signal supplied from a transfer circuit on a lower side to a transfer circuit on an upper side.

In this case, the liquid crystal display section 16 corresponds to a concrete example of a "display section" in the present disclosure. The gate driver 12 corresponds to a concrete example of a "scanning section" in the present disclosure. The transfer block B corresponds to a concrete example of a "first transfer block" in the present disclosure. A transfer circuit 50 corresponds to a concrete example of a "first transfer circuit" in the present disclosure. A transfer circuit 60 corresponds to a concrete example of a "second transfer circuit" in the present disclosure. The scanning control section 51 corresponds to a concrete example of a "control section" in the present disclosure. The clock signals CLK and XCLK correspond to a concrete example of a "transfer clock" in the present disclosure.

[Operation and Action]

The operation and action of the display device 1 according to the present embodiment will next be described.

(Outlines of General Operation)

Outlines of general operation of the display device 1 will first be described with reference to FIG. 4. The control section 11 supplies a control signal to each of the gate driver 12, the source driver 13, the driving electrode driver 14, and the touch detecting section 18 on a basis of an externally supplied video signal Vdisp, and thereby performs control so that the gate driver 12, the source driver 13, the driving electrode driver 14, and the touch detecting section 18 operate in synchronism with each other. The gate driver 12 supplies a scanning signal VG to the liquid crystal display section 16 of the display section 15 equipped with the touch sensor, and thereby sequentially selects one horizontal line as an object of display driving. The source driver 13 supplies a pixel signal Vsig to each of sub-pixels SPix forming the selected horizontal line. The driving electrode driver 14 sequentially applies an alternating-current driving signal VcomDC to driving electrodes COML as an object of touch detection driving, and applies a direct-current driving signal VcomDC to the other driving electrodes COML. The display section 15 equipped with the touch sensor performs display operation and performs touch detecting operation, and outputs a touch detection signal Vdet from the touch detecting electrodes TDL. The touch detecting section 18 detects an external adjacent object on the basis of the touch detection signal Vdet supplied from the touch sensor section 17 of the display section 15 equipped with the touch sensor.

(Detailed Operation)

The operation of the display device 1 will next be described in detail with reference to a few drawings. Incidentally, description will be made in the following by taking operation in the transfer mode MA as an example.

Figure 11:
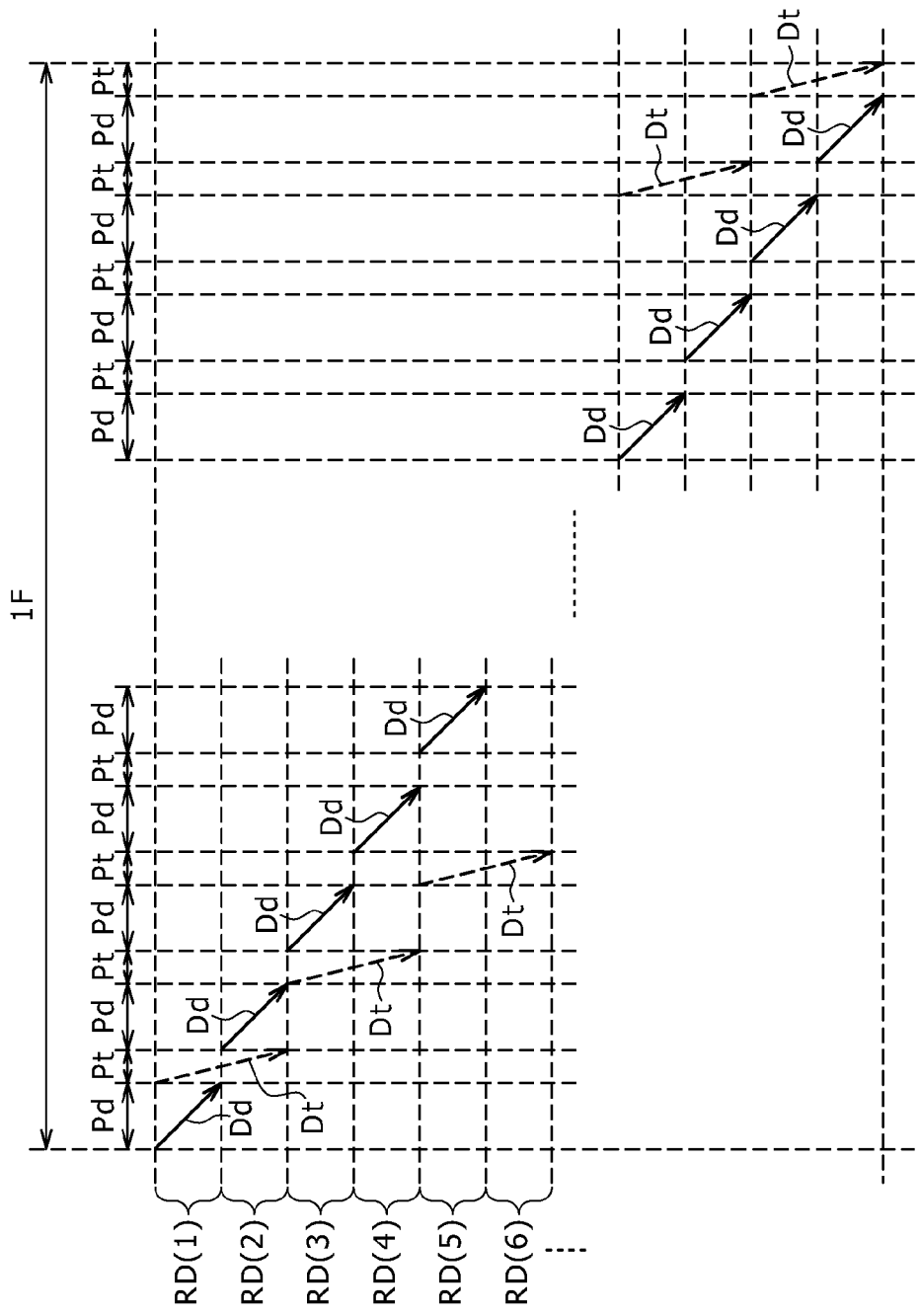
FIG. 11 is a schematic diagram showing an example of operation of the display device shown in FIG. 4.

FIG. 11 schematically shows the operation of the display device 1 in one frame period (1F). In FIG. 11, an axis of abscissas indicates time, and an axis of ordinates indicates positions in a vertical direction (scanning direction) of the display screen. Incidentally, vertical blanking intervals are omitted in FIG. 11.

In one frame period (1F), a display driving period Pd in which display driving Dd is performed and a touch detection driving period Pt in which touch detection driving Dt is performed are arranged alternately. In the present example, touch detection driving Dt is performed at a scanning speed twice that of display driving Dd. That is, touch detecting operation for the entire touch detecting surface is performed twice during the period of one frame period (1F).

First, in a first display driving period Pd, the gate driver 12 and the source driver 13 drive the partial display region RD(1) by line-sequential scanning (display driving Dd).

Next, in a following touch detection driving period Pt, the driving electrode driver 14 sequentially selects a plurality of driving electrodes COML as an object of touch detection driving, and supplies an alternating-current driving signal VcomAC to the selected driving electrodes COML (touch detection driving Dt). The touch detecting section 18 then detects an external adjacent object on the basis of a touch detection signal Vdet output from the touch sensor section 17 according to the alternating-current driving signal VcomAC.

Similarly, the gate driver 12 and the source driver 13 perform display driving Dd of the partial display region RD(2) in a following display driving period Pd, and the driving electrode driver 14 proceeds to perform touch detection driving Dt in a following touch detection driving period Pt.

Thus, the display device 1 performs display operation on the entire display surface and performs touch detecting operation on the entire touch detecting surface by performing display driving Dd and touch detection driving Dt alternately in one frame period (1F). The display device 1 thereby performs display driving Dd and touch detection driving Dt in respective separate periods, so that an effect of display driving Dd on touch detecting operation can be reduced, for example.

Display operation in a display driving period Pd and touch detecting operation in a touch detection driving period Pt will next be described in detail.

Figure 12:
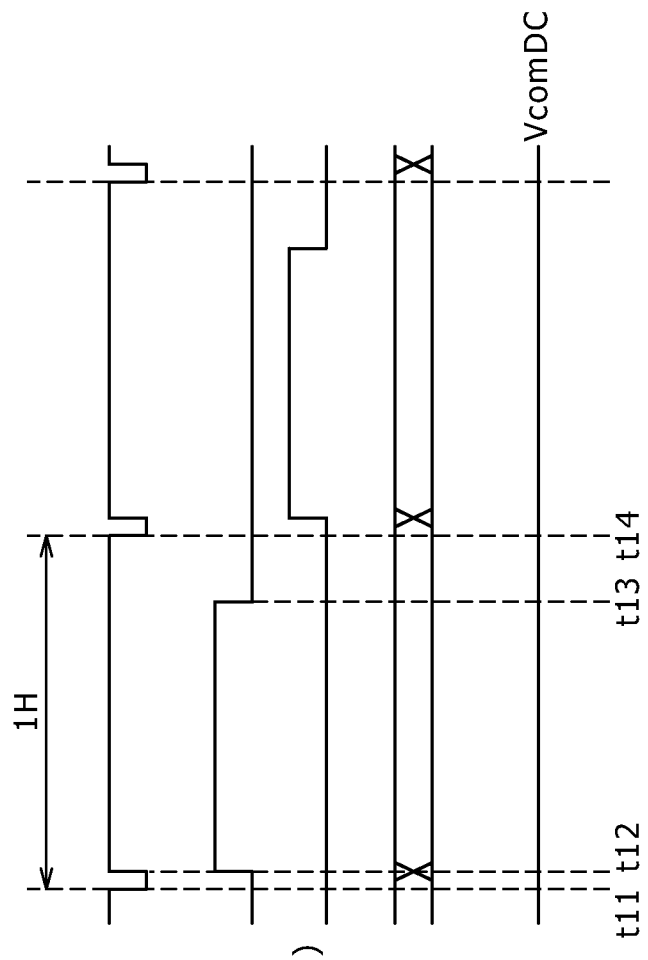
FIGS. 12A, 12B, 12C, and 12D are timing waveform charts showing an example of display operation of the display device shown in FIG. 4.

FIGS. 12A to 12D are timing diagrams of display operation. FIG. 12A shows the waveform of a horizontal synchronizing signal Ssync. FIG. 12B shows the waveform of a scanning signal VG. FIG. 12C shows the waveform of a pixel signal Vsig. FIG. 12D shows the waveform of a driving signal Vcom.

In the display device 1, in a display driving period Pd, the driving electrode driver 14 applies a direct-current driving signal VcomDC to all of the driving electrodes COML (FIG. 12D), and the gate driver 12 sequentially applies a scanning signal VG to a scanning signal line GCL in each horizontal period (1H), whereby display scanning is performed. Details of the display operation will be described in the following.

First, in timing t11, a pulse occurs in the horizontal synchronizing signal Ssync, and one horizontal period (1H) is started.

Next, in timing t12, the gate driver 12 applies a scanning signal VG(n) to a scanning signal line GCL(n) in an nth row relating to display operation, and the scanning signal VG(n) changes from a low level to a high level (FIG. 12B). The gate driver 12 thereby selects one horizontal line as an object of display driving.

At the same time, the source driver 13 applies a pixel signal Vsig to the pixel signal lines SGL (FIG. 12C). The pixel signal Vsig is thereby applied to each of a plurality of sub-pixels SPix belonging to the one horizontal line selected as an object of display driving.

Next, the gate driver 12 in timing t13 changes the scanning signal VG(n) of the scanning signal line GCL in the nth row from the high level to the low level (FIG. 12B). The sub-pixels SPix of the one horizontal line relating to display operation are thereby electrically disconnected from the pixel signal lines SGL.

Then, in timing t14, one horizontal period (1H) is ended, and a new horizontal period (1H) is started to perform display driving in a next row (an (n+1)th row).

By thereafter repeating the above-described operation, the display panel 1 performs display operation in a partial display region RD by line-sequential scanning in each display driving period Pd.

Figure 13:
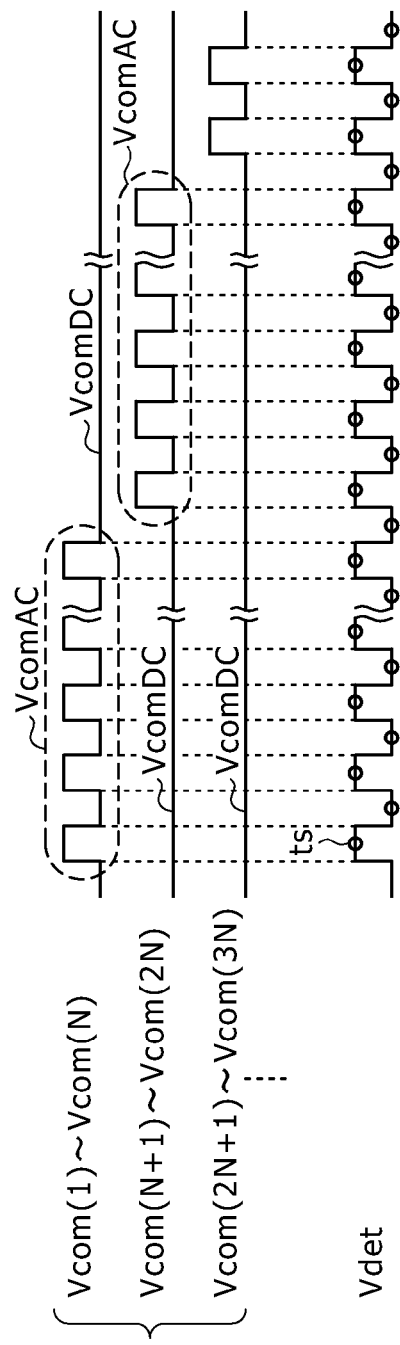
FIGS. 13A and 13B are timing waveform charts showing an example of touch detecting operation of the display device shown in FIG. 4.

FIGS. 13A and 13B are timing diagrams of touch detecting operation. FIG. 13A shows the waveform of the driving signal Vcom. FIG. 13B shows the waveform of the touch detection signal Vdet.

The driving electrode driver 14 in a touch detection driving period Pt sequentially selects a plurality of driving electrodes COML (N driving electrodes COML in the present example) as an object of touch detection driving, and supplies an alternating-current driving signal VcomAC to the selected driving electrodes COML. The alternating-current driving signal VcomAC is transmitted to the touch detecting electrodes TDL via the capacitances, and the touch detection signal Vdet changes (FIG. 13B). The touch detecting section 18 performs touch detecting operation by subjecting the touch detection signal Vdet to A/D (analog-to-digital) conversion in sampling timing is synchronized with each pulse of the alternating-current driving signal VcomAC (FIG. 13B).

(Detailed Operation of Gate Driver 12)

Figure 14:
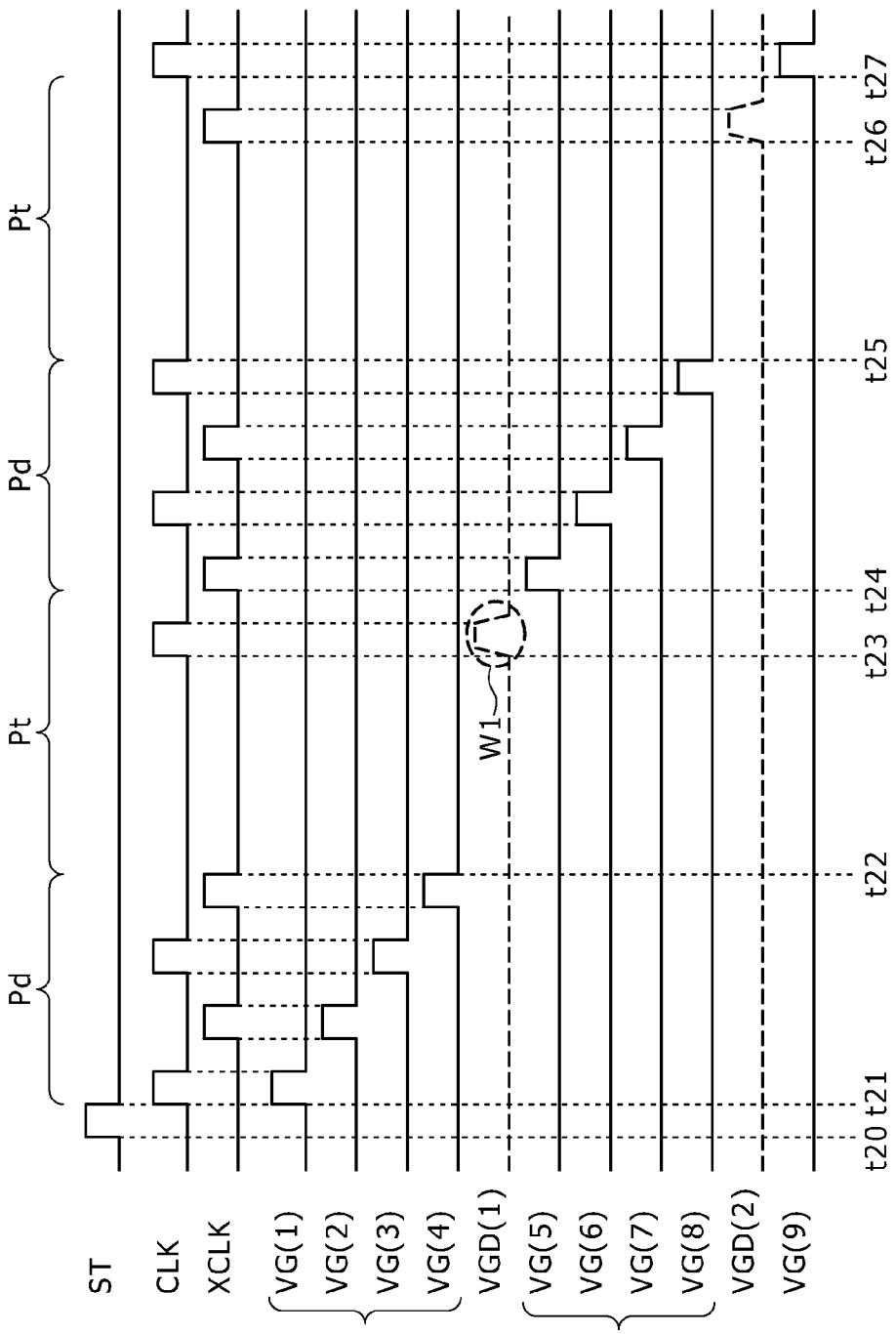
FIGS. 14A, 14B, 14C, 14D, 14E, 14F, 14G, and 14H are timing waveform charts showing an example of operation of the gate driver shown in FIG. 8.

FIGS. 14A to 14H show an example of operation of the gate driver 12. FIG. 14A shows the waveform of the control signal ST. FIG. 14B shows the waveform of the clock signal CLK. FIG. 14C shows the waveform of the clock signal XCLK. FIG. 14D shows the waveforms of scanning signals VG(1) to VG(4). FIG. 14E shows the waveform of a signal VGD(1). FIG. 14F shows the waveforms of scanning signals VG(5) to VG(8). FIG. 14G shows the waveform of a signal VGD(2). FIG. 14H shows the waveform of a scanning signal VG(9).

The gate driver 12 in a display driving period Pd successively generates scanning signals VG and supplies the scanning signals VG to the liquid crystal display section 16. On the other hand, the gate driver 12 in a touch detection driving period Pt stops generating the scanning signals VG. The gate driver 12 controls the generation of such scanning signals VG by the clock signals CLK and XCLK.

First, the scanning control section 51 generates the control signal ST (FIG. 14A). Then, the first transfer circuit 50(1) in the shift register 52 generates the scanning signal VG(1) (FIG. 14D) by transferring the control signal ST in synchronism with the clock signal CLK (FIG. 14B). Then, the second transfer circuit 50(2) generates the scanning signal VG(2) (FIG. 14D) by transferring the scanning signal VG(1) in synchronism with the clock signal XCLK (FIG. 14C). The transfer circuits 50(3) and 50(4) similarly generate the scanning signals VG(3) and VG(4) (FIG. 14D) by transferring respective input signals. Thus, the transfer block B composed of the transfer circuits 50(1) to 50(4) in the display driving period Pd generates the scanning signals VG(1) to VG(4), and supplies the scanning signals VG(1) to VG(4) to the partial display region RD(1) of the liquid crystal display section 16.

Then, after stopping the generation of the clock signals CLK and XCLK in timing t22, the scanning control section 51 resumes the generation of these clock signals in timing t23 (FIGS. 14B and 14C). The transfer circuit 60(1) transfers the signal supplied from the transfer circuit 50(4) in synchronism with a first pulse of the clock signal CLK after the resumption of the generation of the clock signals, and outputs the signal as signal VGD(1) (FIG. 14E). Then, the transfer circuits 50(5) to 50(8) similarly transfer respective input signals in synchronism with the pulses of the clock signals CLK and XCLK which pulses continue appearing after timing t24 (FIG. 14F). That is, the scanning control section 51 stops the generation of the clock signals CLK and XCLK in the touch detection driving period Pt, and thereafter resumes the generation of these clock signals and generates the first pulse. Then, the scanning control section 51 continues generating the clock signals CLK and XCLK in a following display driving period Pd, and the transfer block B composed of the transfer circuits 50(5) to 50(8) generates the scanning signals VG(5) to VG(8) and supplies the scanning signals VG(5) to VG(8) to the partial display region RD(2) of the liquid crystal display section 16.

Thus, the gate driver 12 in the touch detection driving period Pt stops generating the scanning signals VG by temporarily stopping the generation of the clock signals CLK and XCLK.

As shown in FIGS. 14A to 14H, the transfer circuit 60(1) transfers the signal supplied from the transfer circuit 50(4) in the preceding stage at the end of the display driving period Pd in synchronism with the pulse of the clock signal CLK at the end of the touch detection driving period Pt. That is, the transfer circuit 60(1) has a long time from being supplied with the signal from the transfer circuit 50(4) in the preceding stage to being supplied with the pulse of the clock signal CLK for transferring the signal. This may blunt the waveform of the output signal VGD(1) of the transfer circuit 60(1), as will be shown in the following.

Figure 15:
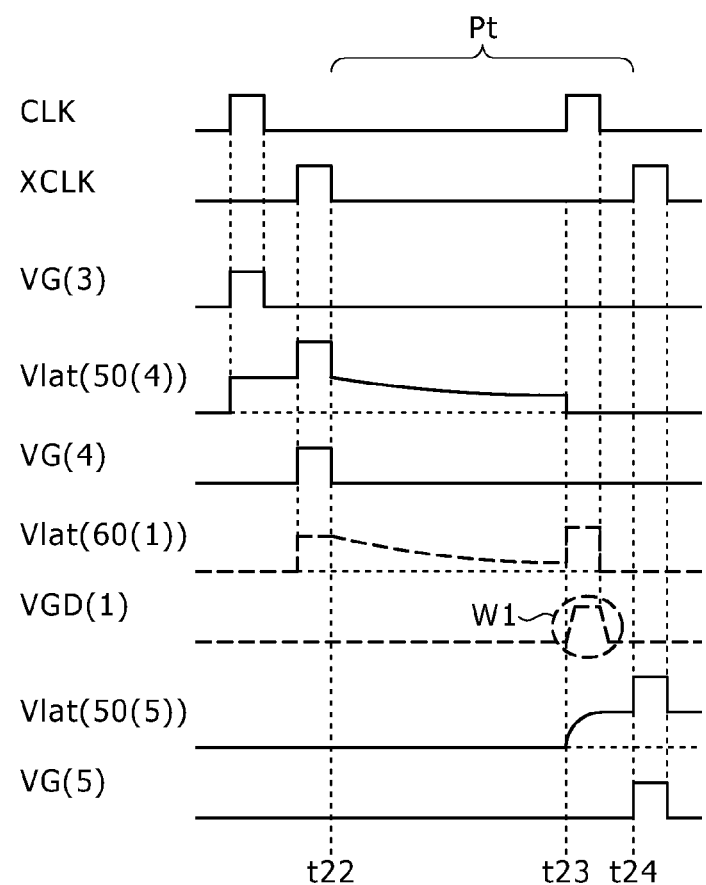
FIGS. 15A, 15B, 15C, 15D, 15E, 15F, 15G, 15H, and 15I are timing waveform charts showing the example of operation of the gate driver shown in FIG. 8 in more detail.

FIGS. 15A to 15I show an example of operation of the transfer circuits 50(4), 60(1), and 50(5). FIG. 15A shows the waveform of the clock signal CLK. FIG. 15B shows the waveform of the clock signal XCLK. FIG. 15C shows the waveform of the scanning signal VG(3) input to the transfer circuit 50(4). FIG. 15D shows the waveform of the voltage Vlat of the transfer circuit 50(4). FIG. 15E shows the waveform of the scanning signal VG(4). FIG. 15F shows the waveform of the voltage Vlat of the transfer circuit 60(1). FIG. 15G shows the waveform of the signal VGD(1). FIG. 15H shows the waveform of the voltage Vlat of the transfer circuit 50(5). FIG. 15I shows the waveform of the scanning signal VG(5). In FIGS. 15A to 15I, timing t22 and the like are the same as timing t22 and the like shown in FIGS. 14A to 14H.

As shown in FIGS. 15C to 15E, the transfer circuit 50(4) has a short time from being supplied with the scanning signal VG(3) from the preceding stage to a subsequent pulse of the clock signal XCLK, and thus operates in a similar manner to that of the example of FIGS. 10A to 10I. In addition, as shown in FIGS. 15G to 15I, the transfer circuit 50(5) has a short time from being supplied with the signal VGD(1) from the preceding stage to a subsequent pulse of the clock signal XCLK, and thus operates in a similar manner to that of the example of FIGS. 10A to 10I.

On the other hand, as shown in FIGS. 15E to 15G, the transfer circuit 60(1) has a long time from being supplied with the scanning signal VG(4) from the preceding stage to a subsequent pulse of the clock signal CLK, and thus operates in a different manner from that of the example of FIGS. 10A to 10I. Specifically, the voltage Vlat of the node LAT of the transfer circuit 60(1) may be gradually lowered with time due to the leakage current of transistors or the like during the period during which the clock signals CLK and XCLK are stopped (FIG. 15F). That is, the node LAT is in a high-impedance state in this period, and therefore the voltage Vlat of the node LAT is gradually lowered with time when the period is long, for example. Hence, even when a first pulse of the clock signals CLK and XCLK at the time of resumption of the generation of the clock signals CLK and XCLK in timing t23 by the scanning control section 51 causes the voltage Vlat to rise due to a bootstrap operation, a voltage level reached by the voltage Vlat is lower than the voltage level of the transfer circuit 50(4) or the like. When the voltage level reached by the voltage Vlat after the bootstrap operation is thus not sufficiently high, the transistor N6 cannot be turned on sufficiently. Therefore, as shown in FIG. 15G, the falling time tf of the output signal may be long and the waveform of the output signal may be blunted (waveform W1).

In other words, the shift register 52 in the present example is formed by n-channel MOS type transistors, and thus the waveform of the output signal may be blunted by dynamic operation. That is, for example, when a shift register is formed as a CMOS (Complementary MOS) circuit using a p-channel MOS type transistor in addition to n-channel MOS type transistors, static operation can be realized. Therefore, even in the case where the clock signals CLK and XCLK are stopped for a long period, a phenomenon as described above does not occur. On the other hand, because the shift register 52 is formed by n-channel MOS type transistors, the waveform of the output signal may be blunted in the case where the clock signals CLK and XCLK are stopped for a long period.

However, the transfer circuit 60(1) in the display device 1 only supplies the signal to the transfer circuit 50(5) in the succeeding stage and does not supply the signal to the liquid crystal display section 16, and can therefore reduce the possibility of affecting the display image quality of the liquid crystal display section 16 unlike a comparative example to be described later.

Comparative Example

Action of the present embodiment will next be described by comparison with a comparative example. The present comparative example is a gate driver configured by using a shift register without transfer circuits 60. The other configuration is similar to that of the present embodiment (FIG. 4 and so forth).

Figure 16:
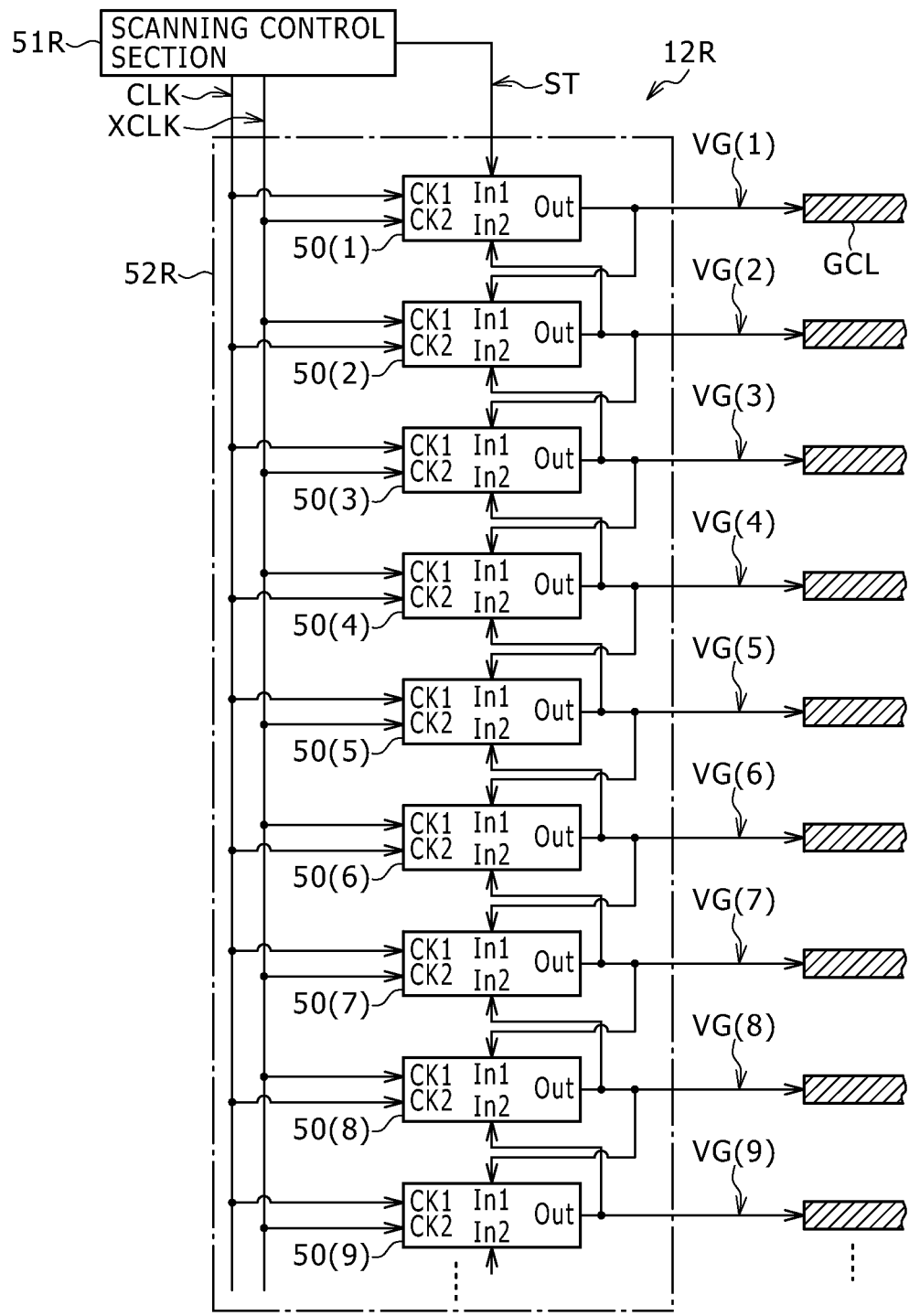
FIG. 16 is a block diagram showing an example of configuration of a gate driver according to a comparative example.

FIG. 16 shows an example of configuration of a gate driver 12R of a display device 1R according to the present comparative example. The gate driver 12R includes a scanning control section 51R and a shift register 52R. The scanning control section 51R controls the shift register 52R. The shift register 52R has transfer circuits 50. That is, unlike the shift register 52 according to the present embodiment (FIG. 8), the shift register 52R does not have transfer circuits 60.

Figure 17:
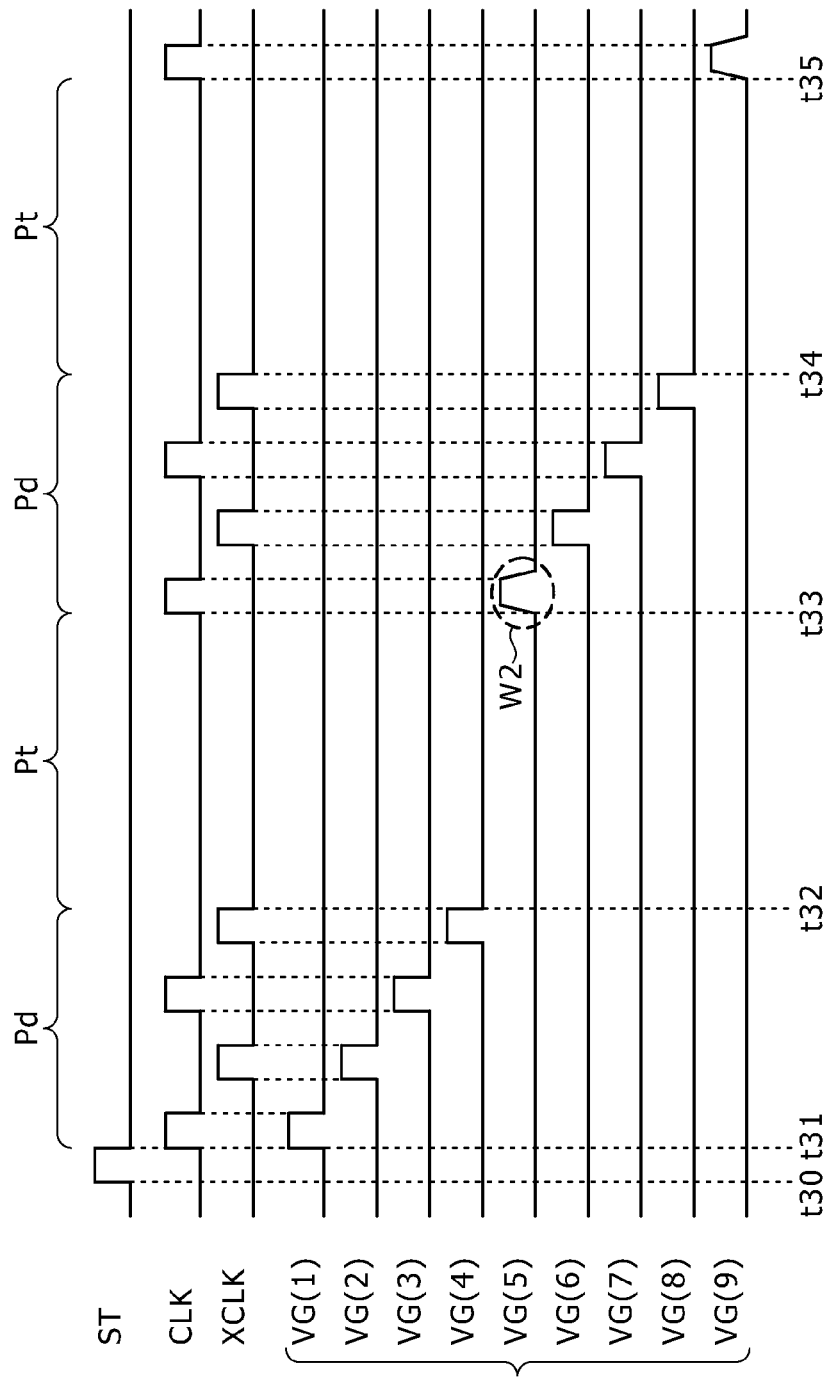
FIGS. 17A, 17B, 17C, and 17D are timing waveform charts showing an example of operation of the gate driver shown in FIG. 16.

FIGS. 17A to 17D show an example of operation of the gate driver 12R. FIG. 17A shows the waveform of a control signal ST. FIG. 17B shows the waveform of a clock signal CLK. FIG. 17C shows the waveform of a clock signal XCLK. FIG. 17D shows the waveform of a scanning signal VG.

As in the present embodiment, the transfer circuits 50(1) to 50(4) of the shift register 52R generate scanning signals VG(1) to VG(4) by transferring respective input signals in synchronism with the clock signals CLK and XCLK in a period from timing t31 to timing t32 (display driving period Pd) (FIG. 17D). The scanning control section 51R then stops generating the clock signals CLK and XCLK in a period from timing t32 to timing t33 (touch detection driving period Pt), and thereafter resumes the generation of these clock signals in timing t33 (FIGS. 17B and 17C). The transfer circuits 50(5) to 50(8) then generate scanning signals VG(5) to VG(8) by transferring respective input signals in a period from timing t33 to timing t34 (display driving period Pd) (FIG. 17D).

At this time, the transfer circuit 50(5) is supplied with the scanning signal VG(4) from the transfer circuit 50(4) in the preceding stage at an end of the display driving period Pd, and transfers the signal in synchronism with a first pulse of the clock signal CLK in the following display driving period Pd. That is, the transfer circuit 50(5) has a long time from being supplied with the scanning signal VG(4) from the transfer circuit 50(4) in the preceding stage to being supplied with the pulse of the clock signal CLK for transferring the signal. This may lengthen the falling time tf of the output signal of the transfer circuit 50(5) and blunt the waveform of the output signal of the transfer circuit 50(5) (waveform W2) as in the case of the transfer circuit 60(1) according to the present embodiment. The output signal of the transfer circuit 50(5) in the gate driver 12R according to the present comparative example is supplied as the scanning signal VG(5) to the liquid crystal display section 16. Therefore the bluntness of the waveform of the scanning signal VG(5) may degrade image quality.

Figure 18:
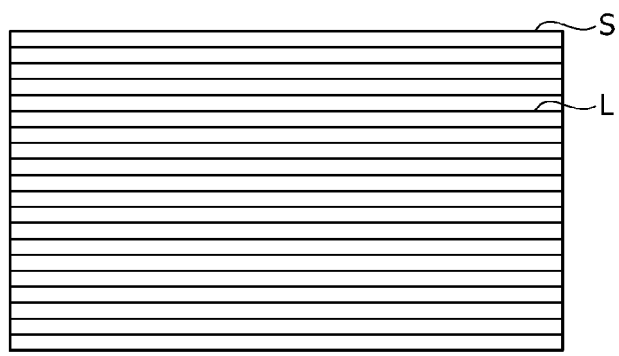
FIG. 18 is a diagram of assistance in explaining an example of an image displayed on a display device according to the comparative example.

FIG. 18 shows an example of a display image in the display device 1R according to the present comparative example. The display device 1R in the present example displays gray over the entire surface of a display screen S. A plurality of lines L extending in a horizontal direction appear on the display screen S. These lines are formed by pixels supplied with a signal such as the scanning signal VG(5) shown in FIG. 17D, for example. That is, because the waveform of the scanning signal VG(5) is blunted as shown in FIG. 17D, a time for writing a pixel signal Vsig to the pixels supplied with the scanning signal VG(5) may be shorter or longer than that of other pixels. In this case, only the pixels supplied with the scanning signal VG(5) are somewhat decreased or somewhat increased in luminance. Therefore, an observer perceives the presence of the plurality of lines L on the display screen S as shown in FIG. 18, and image quality is degraded.

On the other hand, the shift register 52 in the display device 1 according to the present embodiment has the transfer circuits 60 not connected to the scanning signal lines GCL of the liquid crystal display section 16. Therefore, even if the falling times tf of the output signals of the transfer circuits 60 are lengthened, and the waveforms of the output signals of the transfer circuits 60 are blunted, the signals are not supplied to the liquid crystal display section 16, but the output signals (scanning signals VG) of the transfer circuits 50 are supplied to the liquid crystal display section 16. In other words, the gate driver 12 supplies the liquid crystal display section 16 with the scanning signals VG(1), VG(2), . . . whose falling times tf are substantially equal to each other. The display device 1 can therefore suppress the degradation in image quality.

[Effect]

As described above, in the present embodiment, the transfer circuits not connected to the scanning signal lines GCL are provided between adjacent transfer blocks. Thus, even when line-sequential scanning is performed intermittently, the falling times of scanning signals can be made substantially equal to each other. It is therefore possible to suppress the degradation in image quality.

Example of Modification 1-1

In the foregoing embodiment, the clock signals CLK and XCLK are signals whose clock pulses appear alternately. However, the present disclosure is not limited to this. Instead of this, the clock signals CLK and XCLK may be signals logically inverted with respect to each other, for example. A present modification example will be described below in detail.

The configuration of a gate driver 12A in a display device 1A according to the present modification example is similar to the configuration of the gate driver 12 according to the foregoing embodiment (FIG. 8). In the present modification example, a scanning control section 51 is configured to generate clock signals CLK and XCLK logically inverted with respect to each other.

FIGS. 19A to 19I show an example of operation of transfer circuits 50 in the gate driver 12A. In the present example, the operation of a third and a fourth transfer circuits 50(3) and 50(4) in a shift register 52 is shown. FIG. 19A shows the waveform of the clock signal CLK. FIG. 19B shows the waveform of the clock signal XCLK. FIG. 19C shows the waveform of a control signal UD. FIG. 19D shows the waveform of a control signal UDB. FIG. 19E shows the waveform of a scanning signal VG(2). FIG. 19F shows the waveform of voltage Vlat of the node LAT in the transfer circuit 50(3). FIG. 19G shows the waveform of a scanning signal VG(3). FIG. 19H shows the waveform of voltage Vlat of the node LAT in the transfer circuit 50(4). FIG. 19I shows the waveform of a scanning signal VG(4). As shown in FIGS. 19A and 19B, the scanning control section 51 in the gate driver 12A generates the clock signals CLK and XCLK logically inverted with respect to each other.

The operation of the third transfer circuit 50(3) will first be described.

First, in timing t16, the clock signal CLK falls and the clock signal XCLK rises (FIGS. 19A and 19B), and the scanning signal VG(2) rises in synchronism with the transitions of the clock signals CLK and XCLK (FIG. 19E). Thereby, in the third transfer circuit 50(3), the transistor N1 is set in an on state, and the voltage Vlat of the node LAT is changed to the same level as the voltage of the control signal UD (FIG. 19F).

Next, in timing t17, the clock signal CLK rises and the clock signal XCLK falls (FIGS. 19A and 19B), and the scanning signal VG(2) falls in synchronism with the transitions of the clock signals CLK and XCLK (FIG. 19E). Thereby, in the transfer circuit 50(3), first, the node LAT is set in a high-impedance state. Then, a current flows through the transistor N6 according to the rising of the clock signal CLK, and the scanning signal VG(3) as the voltage of the output terminal Out rises (FIG. 19G). At this time, because of the high-impedance state of the node LAT, a voltage across the capacitance element C2 is maintained, so that the voltage Vlat rises due to a so-called bootstrap operation (FIG. 19F). The gate voltage of the transistor N6 thereby becomes sufficiently high. The transfer circuit 50(3) can therefore raise the scanning signal VG(3) to a same voltage level as the high level of the clock signal CLK (FIG. 19G).

Next, in timing t18, the clock signal CLK falls and the clock signal XCLK rises (FIGS. 19A and 19B). Thereby, the transistor N7 is set in an on state, the scanning signal VG(3) as the voltage of the output terminal Out falls (FIG. 19G), and the voltage Vlat of the node LAT also falls at the same time (FIG. 19F).

The operation of the fourth transfer circuit 50(4) will next be described.

First, in timing t17, when the scanning signal VG(3) rises (FIG. 19G), in the transfer circuit 50(4), the transistor N1 is set in an on state, and the voltage Vlat of the node LAT is changed to the same level as the voltage of the control signal UD (FIG. 19H).

Next, in timing t18, when the clock signal CLK falls and the clock signal XCLK rises (FIGS. 19A and 19B), and the scanning signal VG(3) falls (FIG. 19G), in the transfer circuit 50(4), as in the transfer circuit 50(3), the voltage Vlat of the node LAT rises due to a bootstrap operation (FIG. 19H), and the scanning signal VG(4) rises (FIG. 19I).

Then, in timing t19, when the clock signal CLK rises and the clock signal XCLK falls (FIGS. 19A and 19B), the transistor N7 is set in an on state, the scanning signal VG(4) as the voltage of the output terminal Out falls (FIG. 19I), and the voltage Vlat of the node LAT also falls at the same time (FIG. 19H).

FIGS. 20A to 20H show an example of operation of the gate driver 12A. FIG. 20A shows the waveform of the control signal ST. FIG. 20B shows the waveform of the clock signal CLK. FIG. 20C shows the waveform of the clock signal XCLK. FIG. 20D shows the waveforms of scanning signals VG(1) to VG(4). FIG. 20E shows the waveform of a signal VGD(1). FIG. 20F shows the waveforms of scanning signals VG(5) to VG(8). FIG. 20G shows the waveform of a signal VGD(2). FIG. 20H shows the waveform of a scanning signal VG(9).

First, the scanning control section 51A generates the control signal ST (FIG. 20A). Then, the transfer circuits 50(1) to 50(4) in a shift register 52A generate the scanning signals VG(1) to VG(4) (FIG. 20D) by transferring respective input signals in synchronism with the clock signals CLK and XCLK.

Then, the scanning control section 51A stops the generation of the clock signals CLK and XCLK in timing t42, and thereafter resumes the generation of these clock signals in timing t43. In this period, the transfer circuit 60(1) generates a pulse of a large width as in FIG. 20E by performing transfer operation on the basis of the scanning signal VG(4) supplied from the transfer circuit 50(4). Then, in and after timing t43, the transfer circuits 50(5) to 50(8) similarly transfer respective input signals in synchronism with the clock signals CLK and XCLK (FIG. 20F).

FIGS. 21A to 21I show an example of operation of the transfer circuits 50(4), 60(1), and 50(5). FIG. 21A shows the waveform of the clock signal CLK. FIG. 21B shows the waveform of the clock signal XCLK. FIG. 21C shows the waveform of the scanning signal VG(3) input to the transfer circuit 50(4). FIG. 21D shows the waveform of the voltage Vlat of the transfer circuit 50(4). FIG. 21E shows the waveform of the scanning signal VG(4). FIG. 21F shows the waveform of the voltage Vlat of the transfer circuit 60(1). FIG. 21G shows the waveform of the signal VGD(1). FIG. 21H shows the waveform of the voltage Vlat of the transfer circuit 50(5). FIG. 21I shows the waveform of the scanning signal VG(5). In FIGS. 21A to 21I, timing t42 and the like are the same as timing t42 and the like shown in FIGS. 20A to 20H.

The voltage Vlat of the node LAT of the transfer circuit 60(1) rises due to a bootstrap operation (FIG. 21F) when the clock signal CLK rises in timing t42. As in the foregoing embodiment, the voltage Vlat may be gradually lowered with time due to the leakage current of transistors or the like during the period during which the clock signal CLK is stopped (FIG. 21F). In this case, the falling time tf of the output signal of the transfer circuit 60(1) may be long and the waveform of the output signal of the transfer circuit 60(1) may be blunted (waveform W3) when the clock signal CLK falls in timing t43.

However, the transfer circuit 60(1) in the display device 1A only supplies the signal to the transfer circuit 50(5) in the succeeding stage and does not supply the signal to the liquid crystal display section 16, and can therefore reduce the possibility of affecting the display image quality of the liquid crystal display section 16.

Example of Modification 1-2

In the foregoing embodiment, the shift register 52 has the transfer circuits 60 inserted one in each part between adjacent transfer blocks B. However, the present disclosure is not limited to this. A plurality of transfer circuits may be inserted in each part between adjacent transfer blocks B. A present modification example will be described below in detail.

Figure 22:
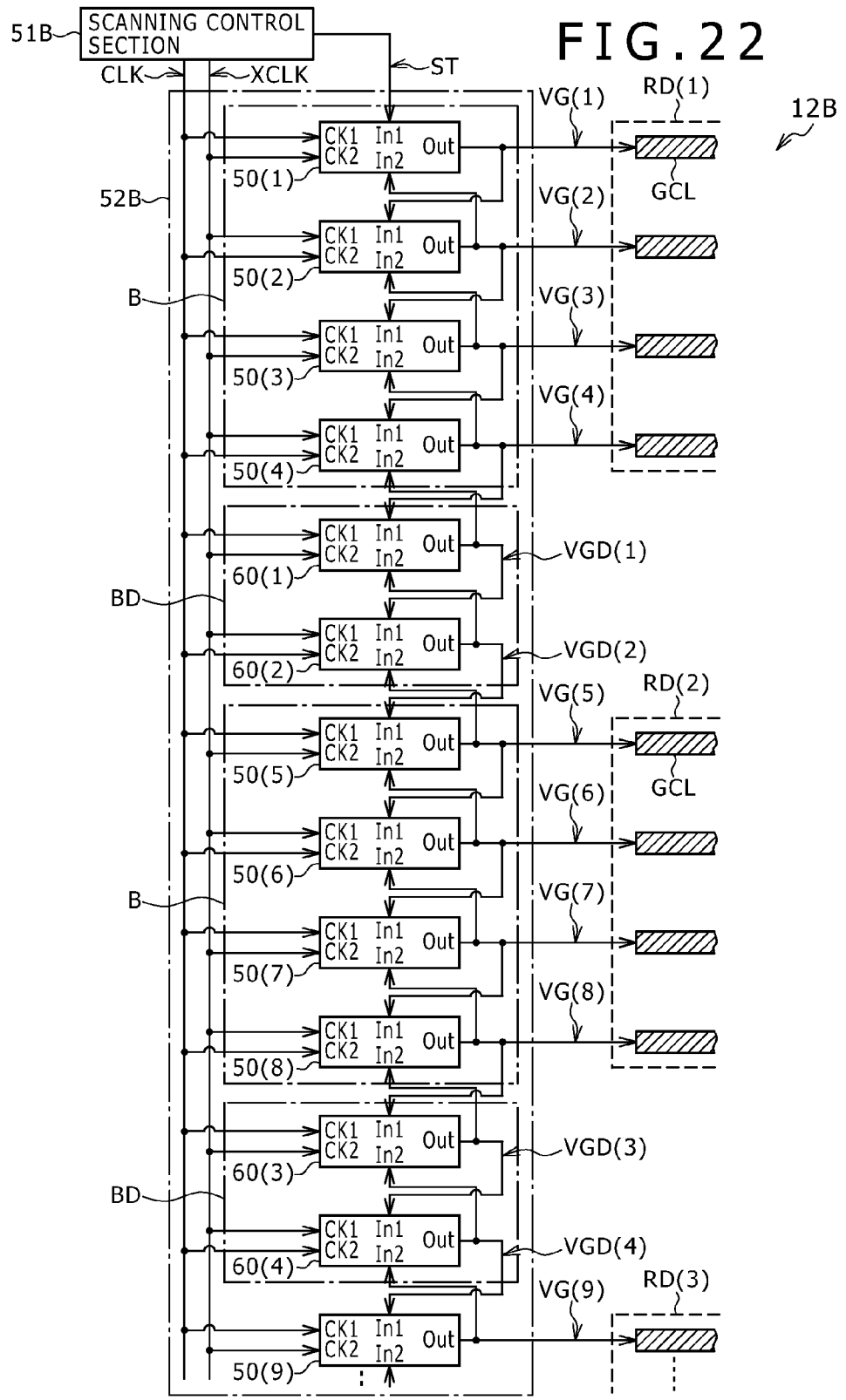
FIG. 22 is a block diagram showing an example of configuration of a gate driver according to another example of modification of the first embodiment.

FIG. 22 shows an example of configuration of a gate driver 12B in a display device 1B according to the present modification example. The gate driver 12B includes a scanning control section 51B and a shift register 52B. The scanning control section 51B controls the shift register 52B. The shift register 52B has two transfer circuits 60 (transfer block BD) inserted in each part between adjacent transfer blocks B. The transfer block BD in this case corresponds to a concrete example of a "second transfer block" in the present disclosure.

Figure 23:
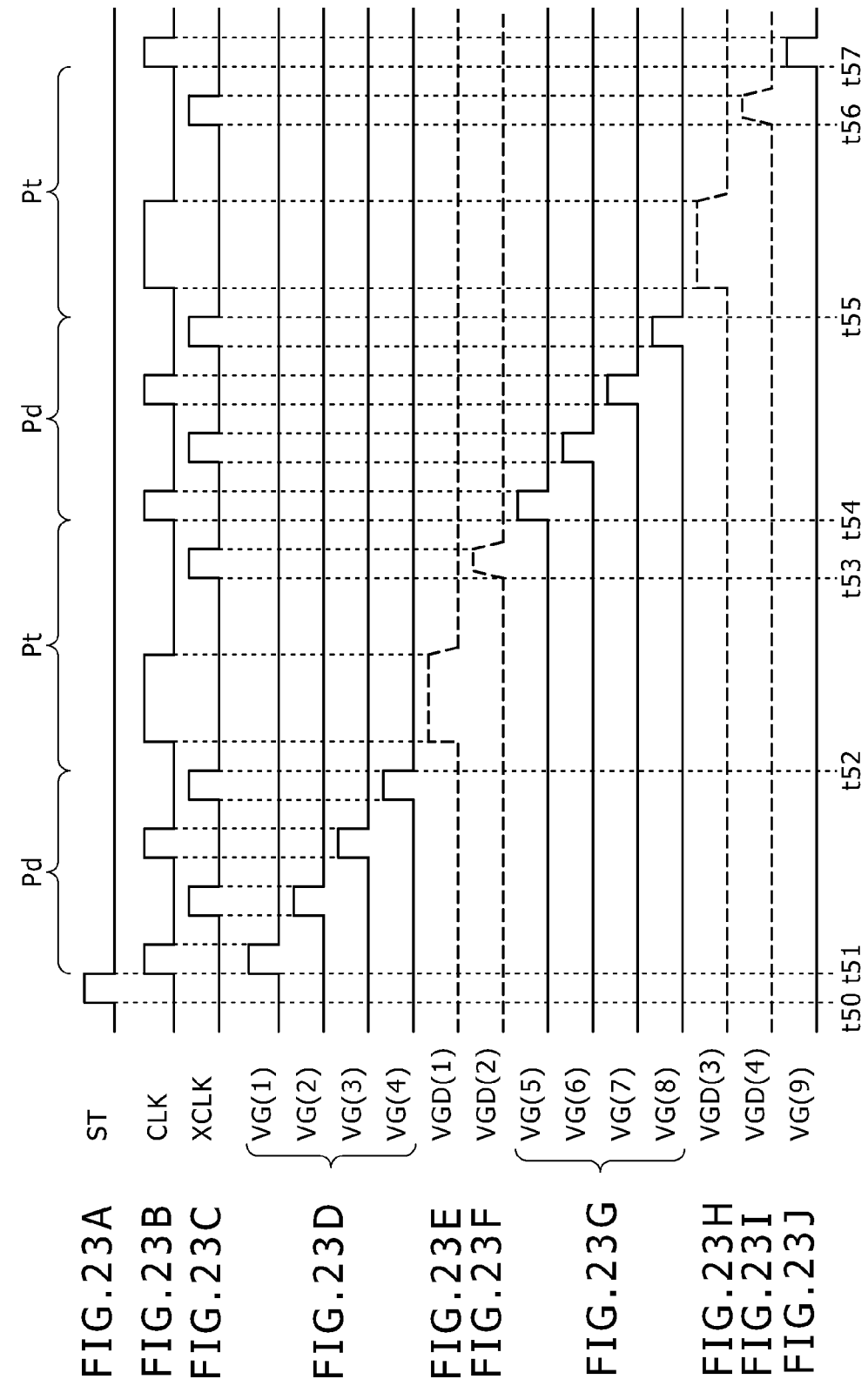
FIGS. 23A, 23B, 23C, 23D, 23E, 23F, 23G, 23H, 23I, and 23J are timing waveform charts showing an example of operation of the gate driver shown in FIG. 22.
Figure 24:
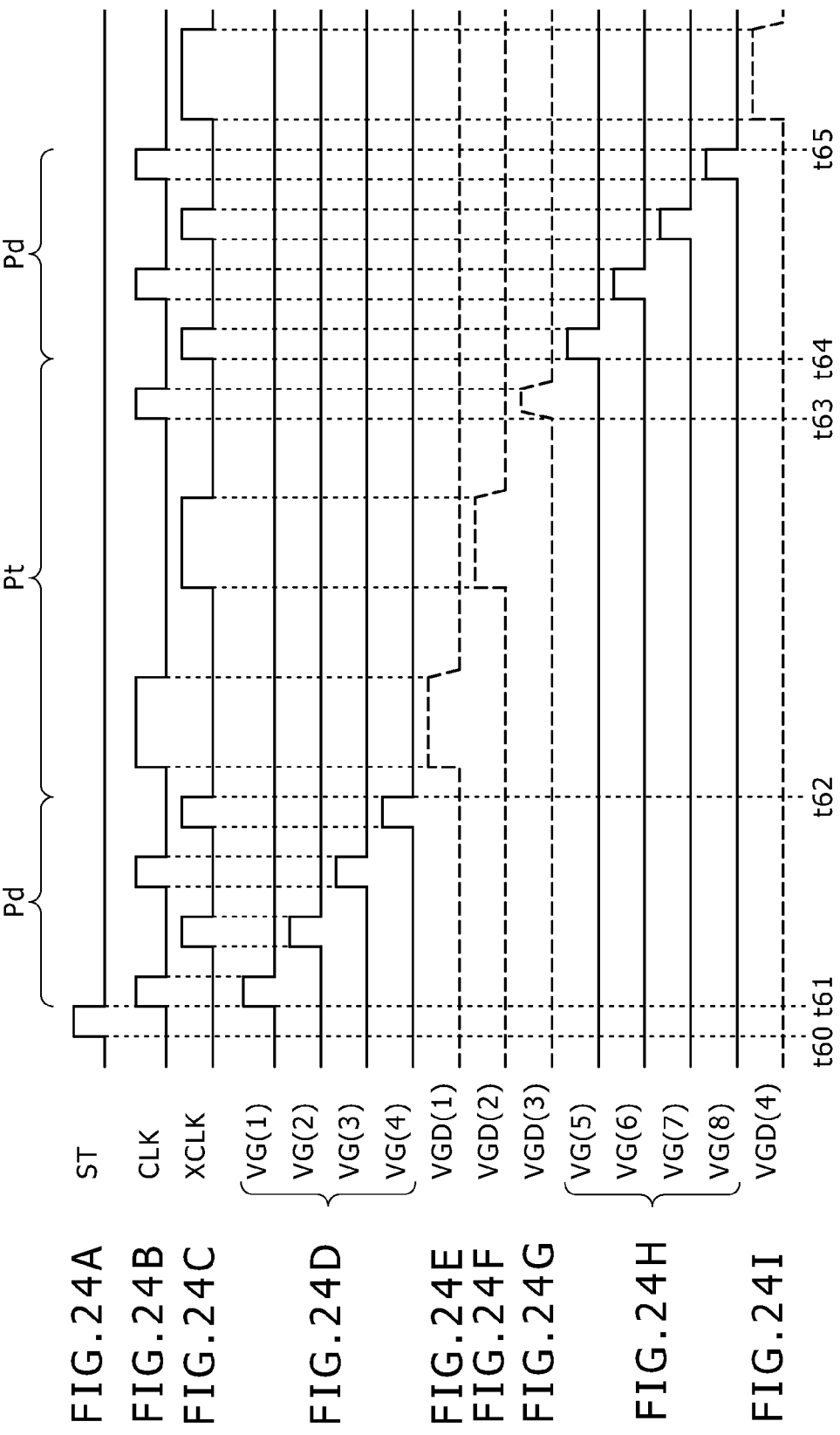
FIGS. 24A, 24B, 24C, 24D, 24E, 24F, 24G, 24H, and 24I are timing waveform charts showing an example of operation of a gate driver according to another example of modification of the first embodiment.

FIGS. 23A to 23J show an example of operation of the gate driver 12B. FIG. 23A shows the waveform of a control signal ST. FIG. 23B shows the waveform of a clock signal CLK. FIG. 23C shows the waveform of a clock signal XCLK. FIG. 23D shows the waveforms of scanning signals VG(1) to VG(4). FIG. 23E shows the waveform of a signal VGD(1). FIG. 23F shows the waveform of a signal VGD(2). FIG. 23G shows the waveforms of scanning signals VG(5) to VG(8). FIG. 23H shows the waveform of a signal VGD(3). FIG. 23I shows the waveform of a signal VGD(4). FIG. 23J shows the waveform of a scanning signal VG(9).

The scanning control section 51B in the gate driver 12B first increases the pulse width of the clock signal CLK in a period from timing t52 to timing t54 (touch detection driving period Pt). In other words, the scanning control section 51B first lowers the frequency of the clock signal CLK in the touch detection driving period Pt. A transfer circuit 60(1) generates the signal VGD(1) by transferring the signal supplied from a transfer circuit 50(4) in synchronism with the pulse of the clock signal CLK (FIG. 23E). The scanning control section 51B then generates a pulse of the clock signal XCLK with the same pulse width as in a display driving period Pd at an end of the touch detection driving period Pt (timing t53). A transfer circuit 60(2) generates the signal VGD(2) by transferring the signal VGD(1) supplied from the transfer circuit 60(1) in synchronism with the pulse of the clock signal XCLK (FIG. 23F). Then, in a following display driving period Pd, transfer circuits 50(5) to 50(8) generate the scanning signals VG(5) to VG(8) by transferring respective input signals (FIG. 23G).

In the present example, two transfer circuits 60 are inserted in each part between adjacent transfer blocks B. However, the present disclosure is not limited to this. Three or more transfer circuits 60 may be inserted in each part between adjacent transfer blocks B. As an example, FIGS. 24A to 24I show an example of operation of a gate driver in a case where three transfer circuits 60 are inserted in each part between adjacent transfer blocks B.

Thus, in the present modification example, a plurality of transfer circuits 60 are inserted in each part between adjacent transfer blocks B. Therefore, more reliable operation can be performed even in a case of a long touch detection driving period Pt. In addition, because the pulse of the clock signals CLK and XCLK at an end of a touch detection driving period Pt is generated with the same pulse width as in a display driving period Pd, the pulse width of the output signal of the last transfer circuit 60 (which output signal is for example a signal VGD(3) in FIG. 24G) among the plurality of inserted transfer circuits 60 can be made to be the same pulse width as that of the scanning signal VG. This enables the transfer circuit 50 in the succeeding stage to be operated more reliably.

[Example of Modification 1-3]

Figure 25:
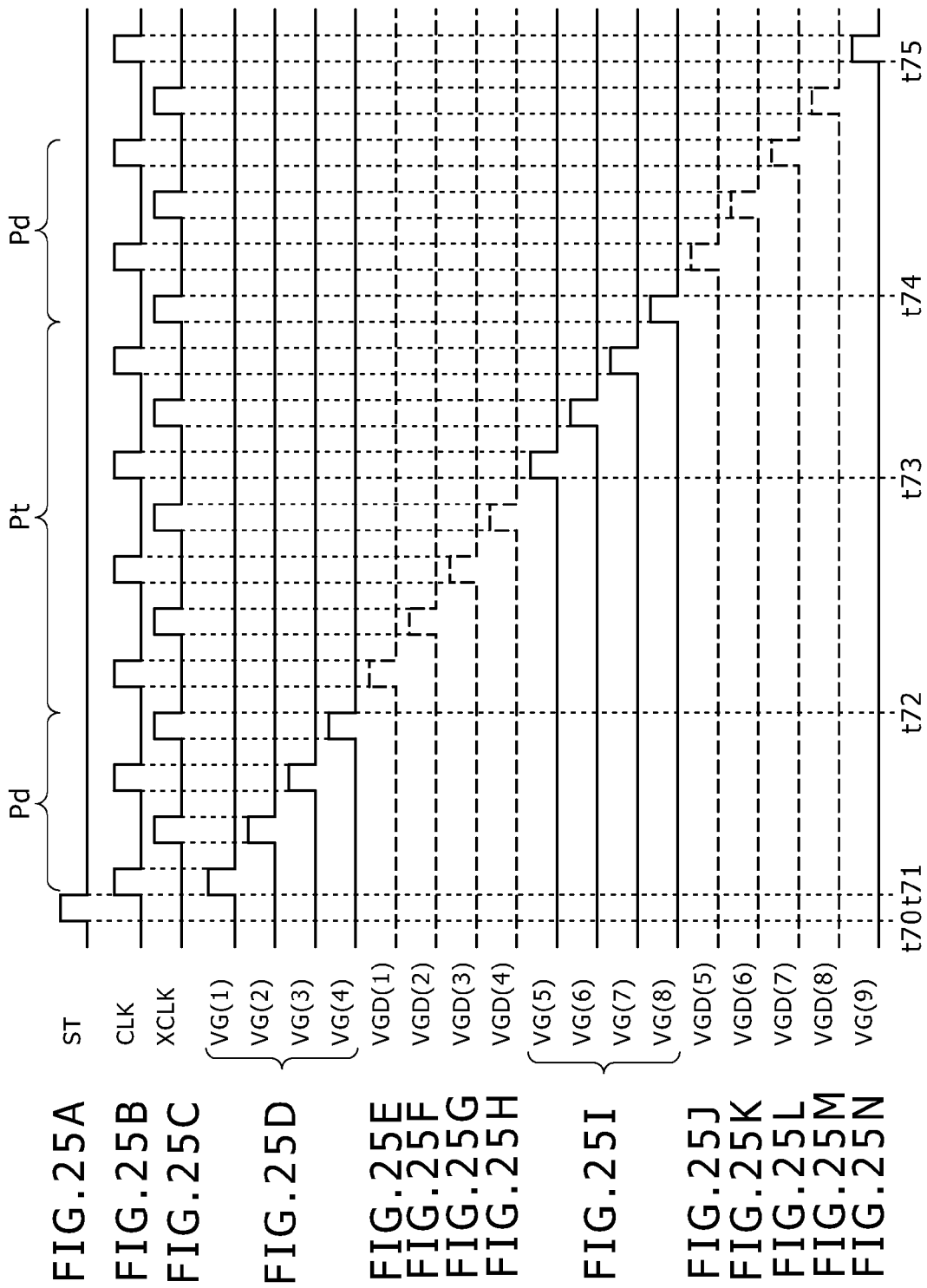
FIGS. 25A, 25B, 25C, 25D, 25E, 25F, 25G, 25H, 25I, 25J, 25K, 25L, 25M, and 25N are timing waveform charts showing an example of operation of a gate driver according to another example of modification of the first embodiment.
Figure 26:
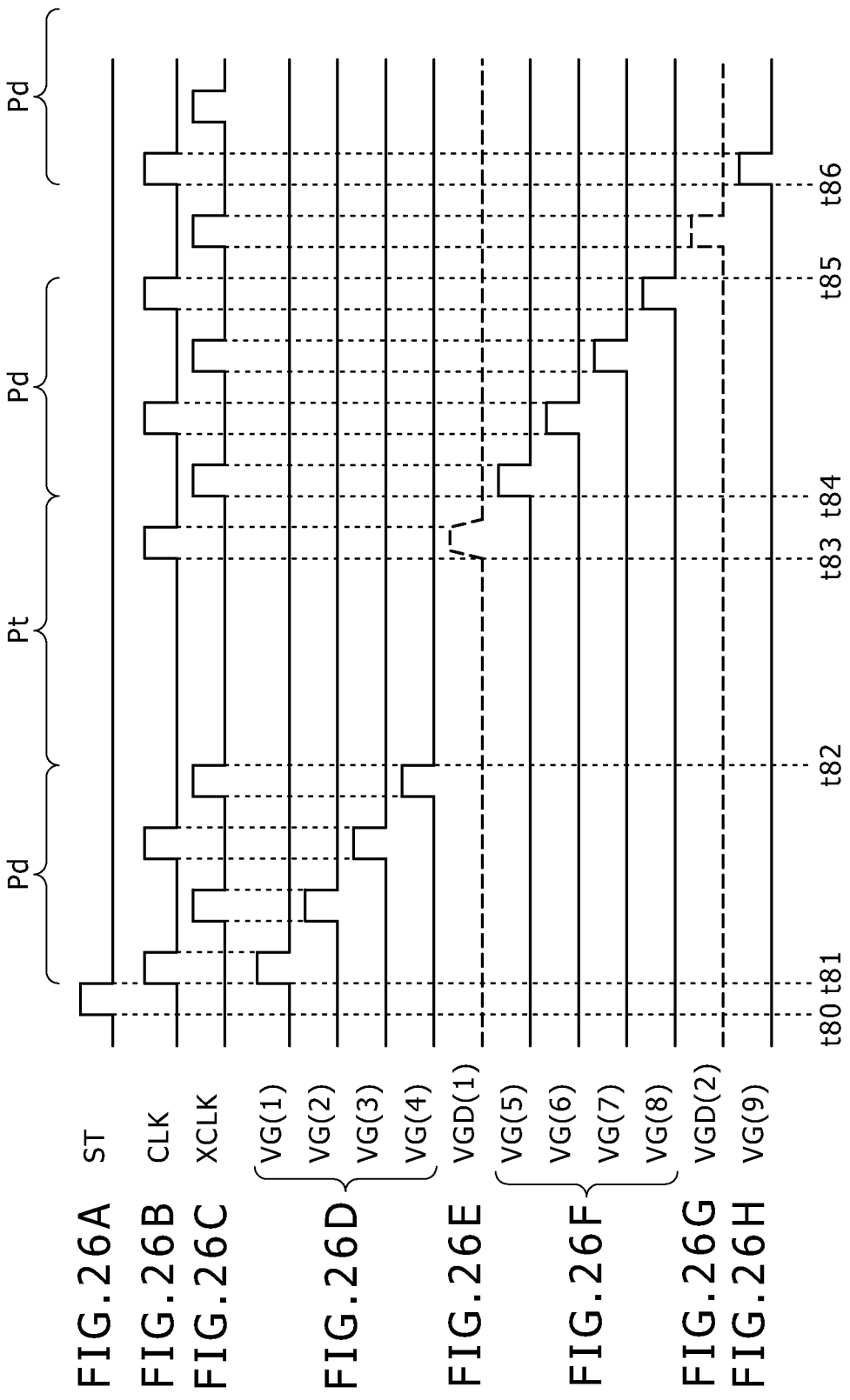
FIGS. 26A, 26B, 26C, 26D, 26E, 26F, 26G, and 26H are timing waveform charts showing an example of operation of a gate driver according to another example of modification of the first embodiment.
Figure 27:
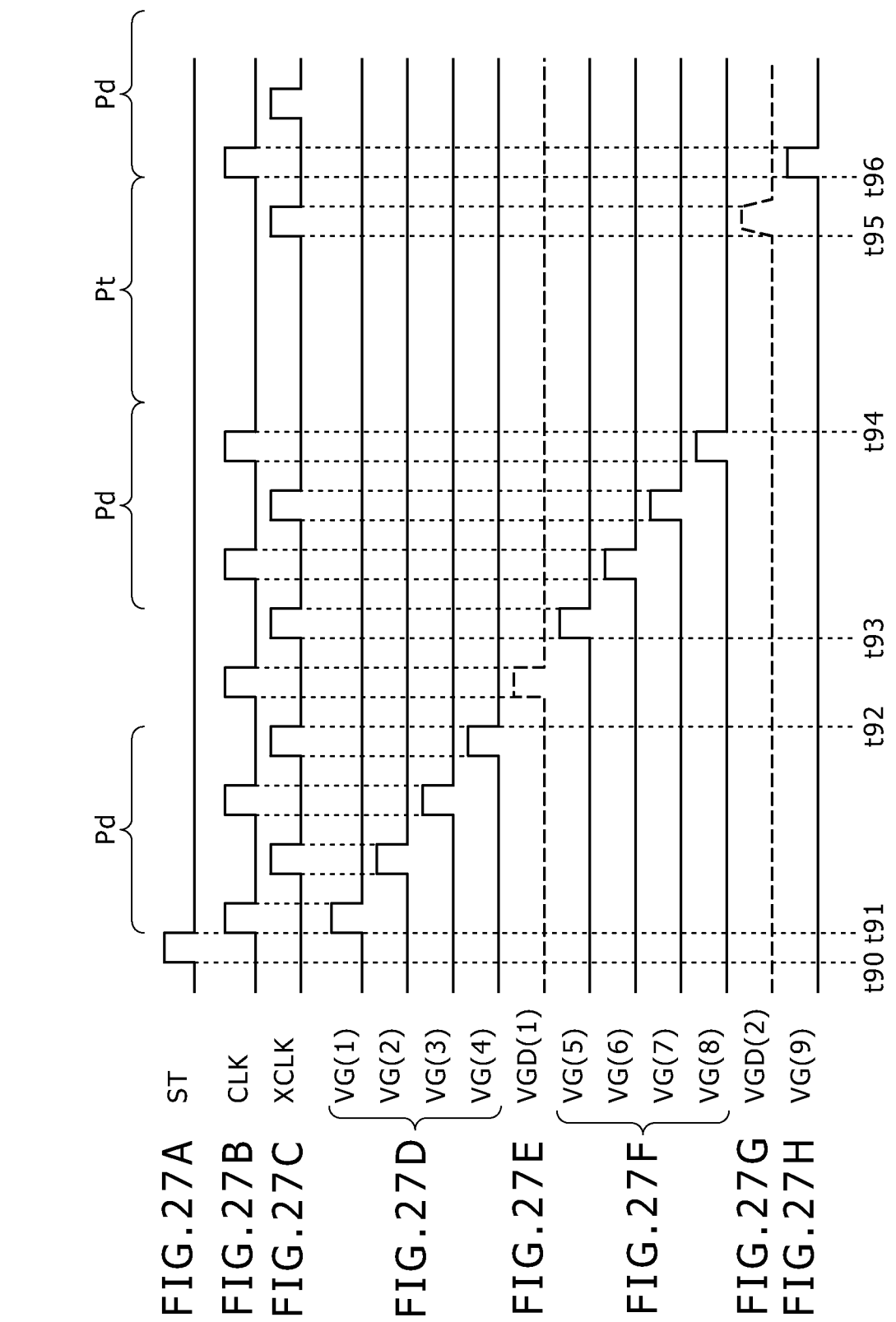
FIGS. 27A, 27B, 27C, 27D, 27E, 27F, 27G, and 27H are timing waveform charts showing an example of operation of a gate driver according to another example of modification of the first embodiment.

In the foregoing embodiment, the scanning control section 51 controls the stopping and resumption of the generation of the clock signals CLK and XCLK. However, the present disclosure is not limited to this. Instead of this, the scanning control section 51 may continue generating the clock signals CLK and XCLK as shown in FIGS. 25A to 25N, for example. In this case, transfer circuits 60 corresponding in number to the length of a touch detection driving period Pt need to be inserted in each part between adjacent transfer blocks B.

[Example of Modification 1-4]

In the foregoing embodiment, the scanning control section 51 stops and resumes the generation of the clock signals CLK and XCLK in the same timing in all frames. However, the present disclosure is not limited to this. Instead of this, the timing may be changed for each frame. Description in the following will be made of an example in which timing of stopping and resumption of the generation of the clock signal CLK in odd frames is different from that in even frames.

FIGS. 26A to 26H and FIGS. 27A to 27H show an example of operation of a gate driver 12D in a display device 1D according to a present modification example. FIGS. 26A to 26H show an example of operation in an odd frame. FIGS. 27A to 27H show an example of operation in an even frame. In an odd frame, as shown in FIGS. 26A to 26H, a transfer circuit 60(1) delays the transfer of a signal, whereby a touch detection driving period Pt is provided in a period from timing t82 to timing t84. In an even frame, as shown in FIGS. 27A to 27H, a transfer circuit 60(2) delays the transfer of a signal, whereby a touch detection driving period Pt is provided in a period from timing t94 to timing t96.

The display device 1D according to the present modification example thus performs different operation according to the frames. Therefore, a degree of freedom of touch detecting operation can be increased.

Incidentally, in the present example, the timing of stopping and resumption of the generation of the clock signals CLK and XCLK is changed in each frame. However, the present disclosure is not limited to this. For example, the timing may be changed for every predetermined number of frames. In addition, the timing may be changed according to the operation mode of the display device.

[Example of Modification 1-5]

Figure 28:
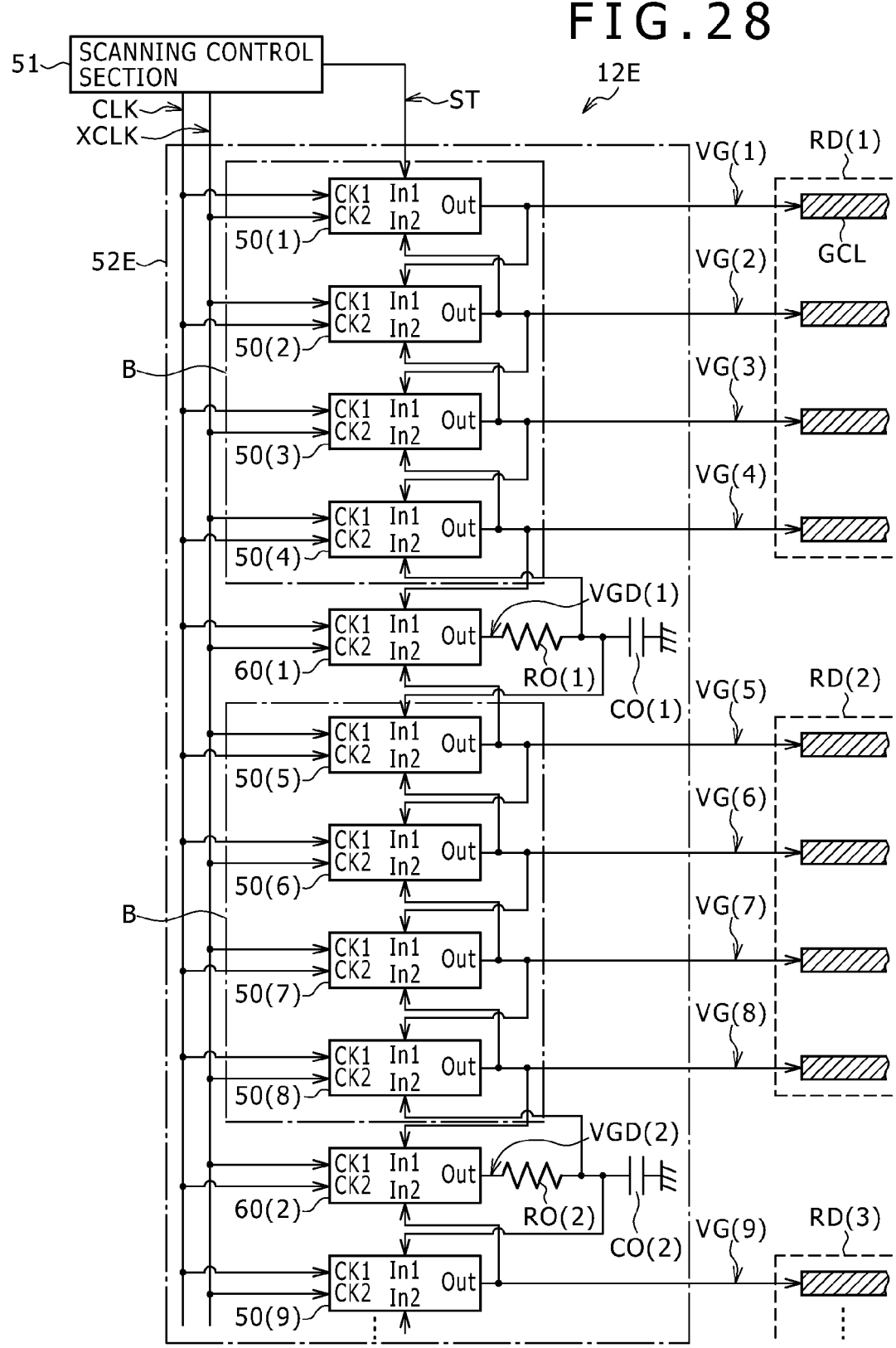
FIG. 28 is a block diagram showing an example of configuration of a gate driver according to another example of modification of the first embodiment.

In the foregoing embodiment, the output signal of a transfer circuit 60 in the shift register 52 is directly supplied to a transfer circuit 50 in a succeeding stage. However, the present disclosure is not limited to this. Instead of this, as shown in FIG. 28, for example, the output signal may be supplied to the transfer circuit 50 in the succeeding stage via an LPF (Low Pass Filter) composed of a resistance element RO (resistance elements RO(1), RO(2), . . . ) and a capacitance element CO (capacitance elements CO(1), CO(2), . . . ). The LPF composed of the resistance element RO and the capacitance element CO corresponds to a concrete example of a "load circuit" in the present disclosure. Thereby, the rising time tr and the falling time tf of the output signal VGD of the transfer circuit 60 can be approximated to the rising time tr and the falling time tf of the output signal VG of the transfer circuit 50.

Specifically, because the transfer circuit 50 drives the load of a scanning signal line GCL, the rising time tr and the like of the output signal VG of the transfer circuit 50, for example, may be somewhat long. On the other hand, because the transfer circuit 60 does not drive a scanning signal line GCL, the rising time tr and the like of the output signal VGD(1) are somewhat short. In a present modification example, the transfer circuit 60 supplies the signal VGD(1) to the transfer circuit 50 in the succeeding stage via the LPF composed of the resistance element RO and the capacitance element CO. Therefore, the rising time tr and the like of the output signal VGD(1) can be approximated to the rising time tr and the like of the output signal VG of the transfer circuit 50. Thus, the transfer of signals in the shift register can be performed more reliably.

Incidentally, in the present example, the LPF composed of the resistance element RO and the capacitance element CO is used. However, the present disclosure is not limited to this. Instead of this, only a capacitance element may be provided, for example, so that an LPF is formed by the output impedance of the transfer circuit 60 and the capacitance element.

[Example of Modification 1-6]

Figure 29:
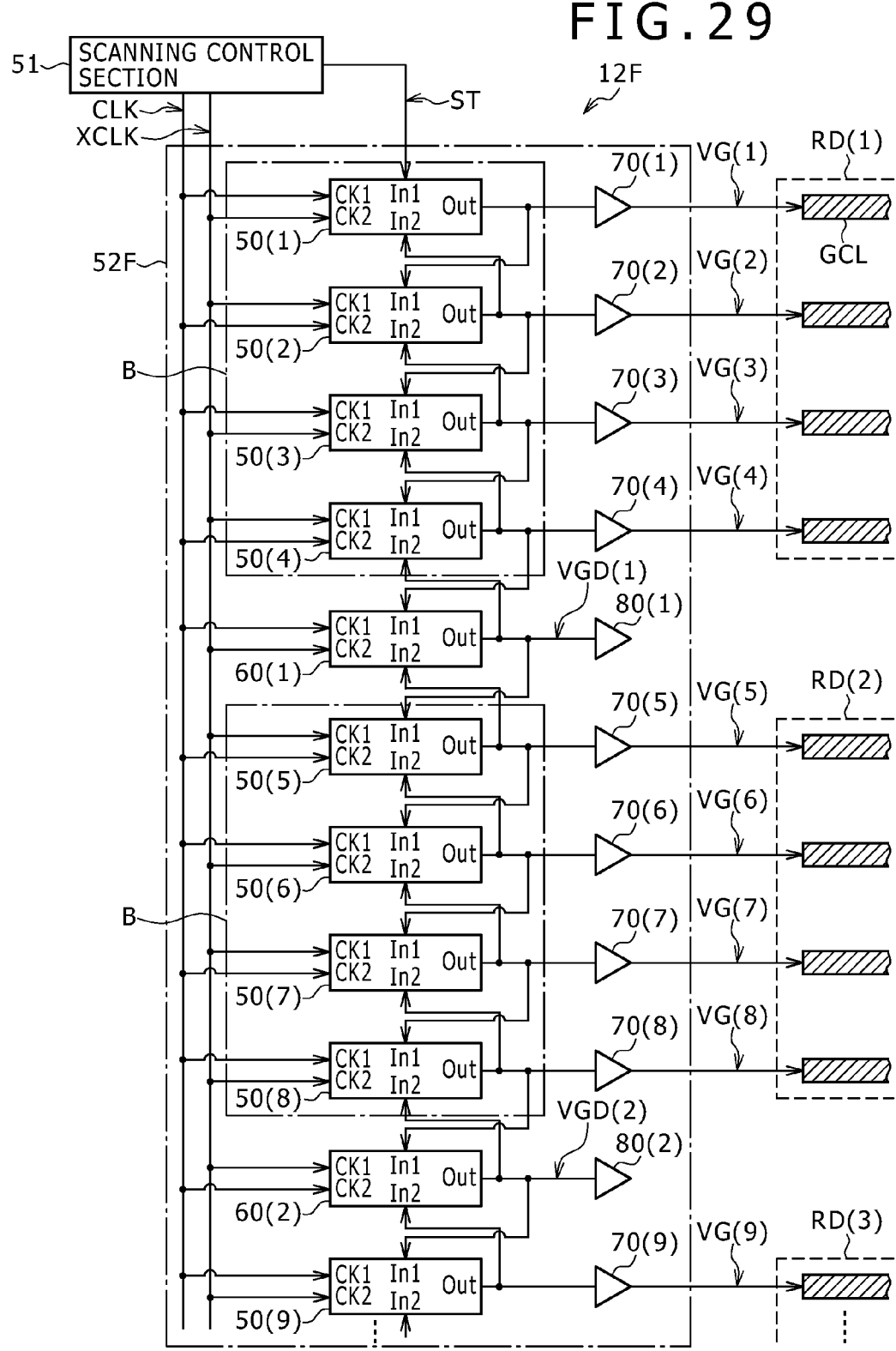
FIG. 29 is a block diagram showing an example of configuration of a gate driver according to another example of modification of the first embodiment.
Figure 30:
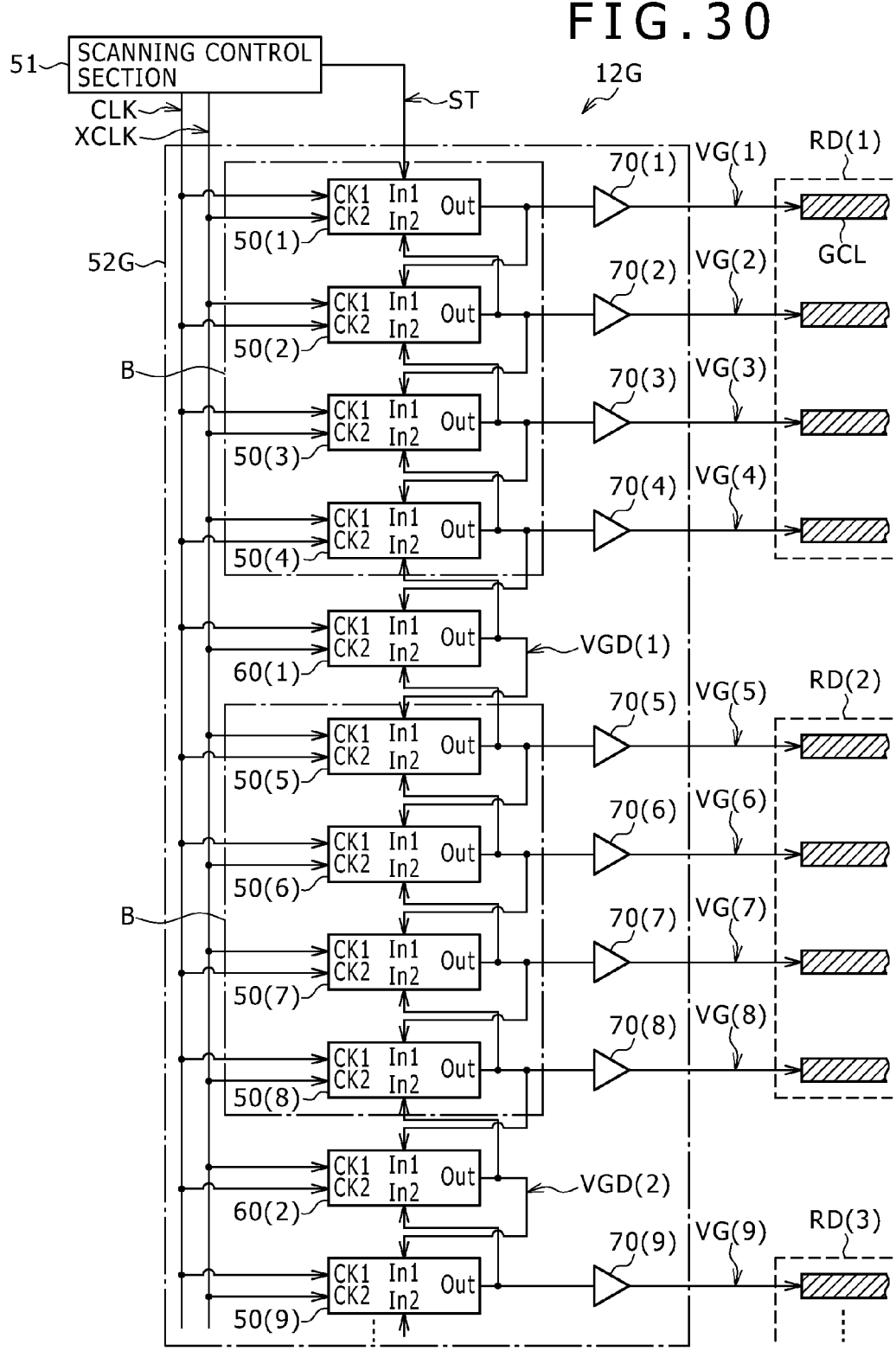
FIG. 30 is a block diagram showing an example of configuration of a gate driver according to another example of modification of the first embodiment.

In the foregoing embodiment, the transfer circuit 50 directly drives the scanning signal line GCL. However, the present disclosure is not limited to this. Instead of this, as shown in FIGS. 29 and 30, for example, the scanning signal line GCL may be driven via a buffer 70 (buffers 70(1), 70(2), . . . ). In this case, as shown in FIG. 29, for example, a buffer 80 (buffers 80(1), 80(2), . . . ) may be provided as a load for a transfer circuit 60 so that the load of the transfer circuit 50 is nearly equal to the load of the transfer circuit 60. In addition, when a difference between the loads does not affect characteristics, the buffer 80 may be omitted as in FIG. 30.

[Example of Modification 1-7]

In the foregoing embodiment, the transfer circuits 60 have the same circuit configuration as the transfer circuits 50. However, the present disclosure is not limited to this. The transfer circuits 60 may have a different configuration from the transfer circuits 50 when the transfer circuits 60 have similar functions.

[3. Second Embodiment]

A display device 2 according to a second embodiment will next be described. The present embodiment is a gate driver formed by a shift register without the transfer circuits 60. The other configuration is similar to that of the foregoing first embodiment (FIG. 4). Incidentally, constituent parts essentially identical to those of the display device 1 according to the foregoing first embodiment are identified by the same reference symbols, and description thereof will be omitted as appropriate.

Figure 31:
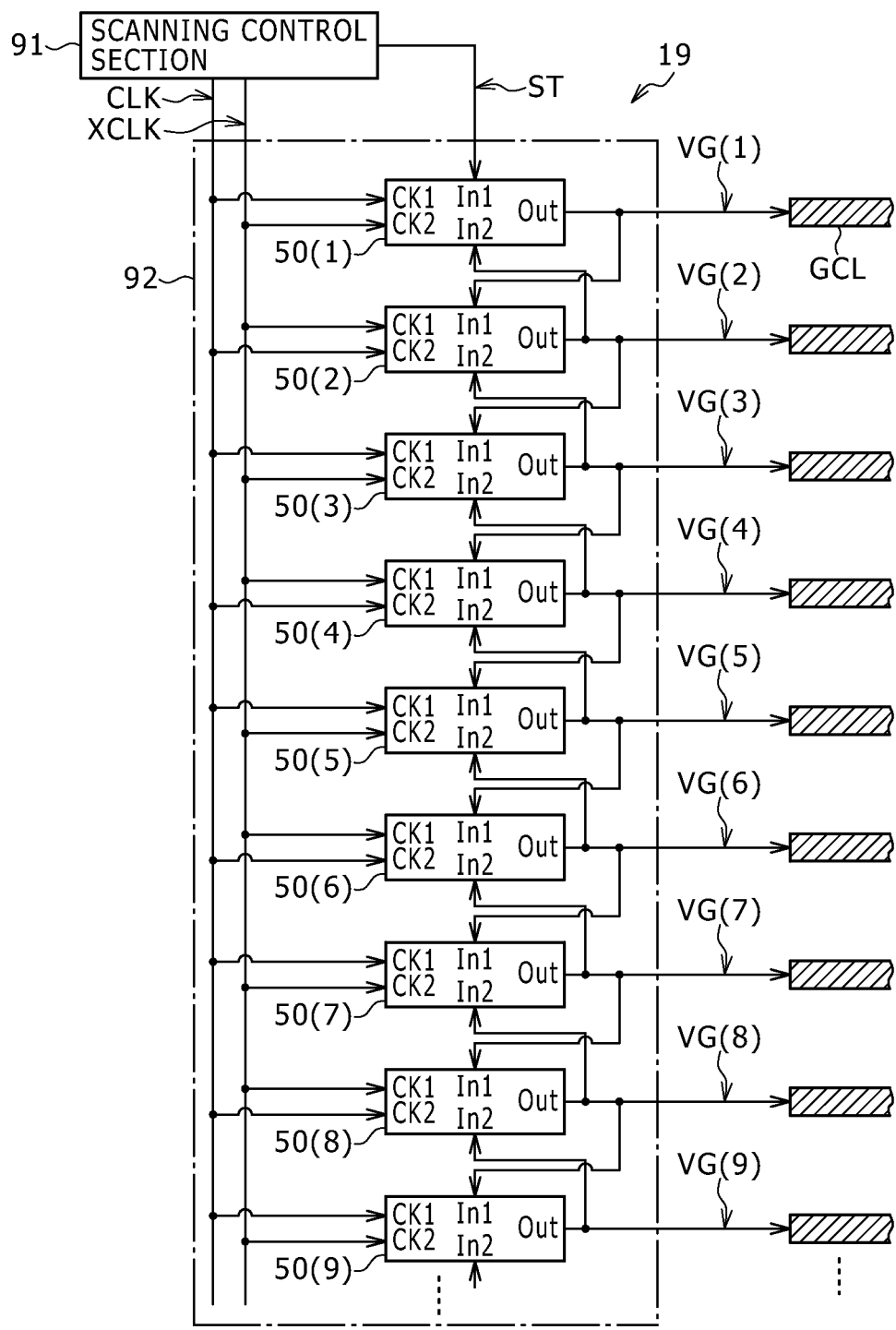
FIG. 31 is a block diagram showing an example of configuration of a gate driver according to a second embodiment.

FIG. 31 shows an example of configuration of a gate driver 19 according to the present embodiment. The gate driver 19 includes a scanning control section 91 and a shift register 92. The scanning control section 91 controls the shift register 92. Specifically, as with the scanning control section 51 according to the foregoing first embodiment, the scanning control section 91 controls the generation of a scanning signal VG by the shift register 92 by generating clock signals CLK and XCLK and stopping the generation of the clock signals CLK and XCLK. In doing so, as will be described later, the scanning control section 91 increases the amplitude of a first pulse in a display driving period Pd among the pulses of the clock signals CLK and XCLK, and outputs the first pulse increased in amplitude. The shift register 92 has transfer circuits 50. That is, unlike the shift register 52 according to the foregoing embodiment, the shift register 92 does not have the transfer circuits 60.

FIGS. 32A to 32D show an example of operation of the gate driver 19. FIG. 32A shows the waveform of a control signal ST. FIG. 32B shows the waveform of the clock signal CLK. FIG. 32C shows the waveform of the clock signal XCLK. FIG. 32D shows the waveforms of the scanning signals VG.

As in the foregoing embodiment, the transfer circuits 50(1) to 50(4) of the shift register 92 generate scanning signals VG(1) to VG(4) by transferring respective input signals in a period from timing t101 to timing t102 (display driving period Pd) (FIG. 32D). The scanning control section 91 then stops generating the clock signals CLK and XCLK in a period from timing t102 to timing t103 (touch detection driving period Pt), and thereafter resumes the generation of these clock signals in timing t103 (FIG. 32B). At this time, the scanning control section 91 increases the amplitude of the first pulse of the clock signal CLK in a display driving period Pd beginning in timing t103 (waveform W4). That is, the scanning control section 91 increases the amplitude of the pulse of the clock signal CLK as the first pulse in the display driving period Pd among the pulses of the clock signals CLK and XCLK. The transfer circuits 50(5) to 50(8) then generate scanning signals VG(5) to VG(8) by transferring respective input signals in a period from timing t103 to timing t104 (display driving period Pd) (FIG. 32D).

The above-described operation is thereafter repeated. The scanning control section 91 thus increases the amplitude of the first pulse of the clock signal CLK in the display driving period Pd after the touch detection driving period Pt.

FIGS. 33A to 33I show an example of operation of the transfer circuits 50(4) to 50(6). FIG. 33A shows the waveform of the clock signal CLK. FIG. 33B shows the waveform of the clock signal XCLK. FIG. 33C shows the waveform of the scanning signal VG(3) input to the transfer circuit 50(4). FIG. 33D shows the waveform of the voltage Vlat of the transfer circuit 50(4). FIG. 33E shows the waveform of the scanning signal VG(4). FIG. 33F shows the waveform of the voltage Vlat of the transfer circuit 50(5). FIG. 33G shows the waveform of the signal VG(5). FIG. 33H shows the waveform of the voltage Vlat of the transfer circuit 50(6). FIG. 33I shows the waveform of the scanning signal VG(6). In FIGS. 33A to 33I, timing t102 and the like are the same as timing t102 and the like shown in FIGS. 32A to 32D.

In the transfer circuit 50(5), as shown in FIGS. 33E to 33G, the voltage Vlat of the node LAT of the transfer circuit 50(5) may be gradually lowered with time as in the foregoing first embodiment and the like (FIG. 33F). Then, when the scanning control section 91 resumes the generation of the clock signals CLK and XCLK in timing t103, the first pulse of the clock signal CLK causes the voltage Vlat to rise due to a bootstrap operation. At this time, the scanning control section 91 generates the pulse of a larger amplitude than normal (waveform W4), and therefore a voltage level reached by the voltage Vlat after the bootstrap operation also becomes somewhat higher. Thereby the transistor N6 can be turned on sufficiently. Thus, as shown in FIG. 33G, the falling time tf of the output signal can be shortened and the blunting of the waveform of the output signal can be suppressed (waveform W5).

Incidentally, in the present example, the amplitude of the first pulse of the clock signal CLK is increased in each display driving period Pd. This is because each transfer block B includes an even number of (four) transfer circuits 50 and therefore the first pulse in the display driving periods Pd is the pulse of the clock signal CLK. On the other hand, for example, when each transfer block B includes an odd number of transfer circuits 50, the clock signals CLK and XCLK alternately become the first pulse in respective display driving periods Pd. Specifically, for example, the first pulse in a certain display driving period Pd becomes the pulse of the clock signal CLK, and the first pulse in a next display driving period Pd becomes the pulse of the clock signal XCLK. Hence, in this case, the amplitude of the pulse of the clock signal CLK and the amplitude of the pulse of the clock signal XCLK can be alternately increased in respective display driving periods Pd.

Thus, the display device 2 increases the amplitude of the first pulse in display driving periods Pd among the pulses of the clock signals CLK and XCLK. It is therefore possible to shorten the falling time tf of the output signal of the transfer circuit, and suppress the blunting of the waveform of the output signal. In other words, the gate driver 19 can supply the liquid crystal display section 16 with the scanning signals VG(1), VG(2), . . . whose falling times tf are substantially equal to each other. The display device 2 can therefore suppress degradation in image quality.

As described above, in the present embodiment, the amplitude of the first pulse of the clock signal in display driving periods is increased. Thus, even when line-sequential scanning is performed intermittently, the falling times of scanning signals can be made substantially equal to each other. It is therefore possible to suppress degradation in image quality. Other effects are similar to those of the foregoing first embodiment.

<4. Examples of Application>

An example of application of the display devices described in the foregoing embodiments and the foregoing modification examples will next be described.

FIG. 34 shows an external appearance of a television device to which the display devices according to the foregoing embodiments and the like are applied. This television device for example has a video display screen section 510 including a front panel 511 and a filter glass 512. The video display screen section 510 is formed by one of the display devices according to the foregoing embodiments and the like.

The display devices according to the foregoing embodiments and the like are applicable not only to such television devices but also to electronic devices in all fields such as digital cameras, notebook personal computers, portable terminal devices such as portable telephones and the like, portable type game machines, video cameras, or the like. In other words, the display devices according to the foregoing embodiments and the like are applicable to electronic devices in all fields which electronic devices display video.

The present technology has been described above by citing a few embodiments, modification examples, and examples of application to electronic devices. However, the present technology is not limited to these embodiments and the like, and is susceptible of various modifications.

For example, in the foregoing embodiments and the like, the liquid crystal display section 16 using a liquid crystal in a transverse electric field mode such as an FFS mode, an IPS mode, or the like is integrated with the touch sensor section 17. However, instead of this, a liquid crystal display section using a liquid crystal in one of various modes such as a TN (Twisted Nematic) mode, a VA (Vertical Alignment) mode, an ECB (Electrically Controlled Birefringence) mode, and the like may be integrated with the touch sensor section 17. When such a liquid crystal is used, a display section equipped with a touch sensor can be formed as shown in FIG. 35. FIG. 35 shows an example of a sectional structure of principal parts of the display section 15B equipped with the touch sensor according to a present modification example, and shows a state of a liquid crystal layer 9B being sandwiched between a pixel substrate 20B and a counter substrate 30B. The names, functions, and the like of other parts are similar to those of FIG. 5, and therefore description thereof will be omitted. In the present example, unlike FIG. 5, driving electrodes COML used both for display and for touch detection are formed on the counter substrate 30B.

In addition, for example, in the foregoing embodiments and the like, the so-called in-cell type is shown in which the liquid crystal display section 16 and the capacitance type touch sensor section 17 are integrated with each other. However, the present disclosure is not limited to this. Instead of this, a so-called on-cell type may be adopted in which a capacitance type touch sensor section is formed on the surface of a liquid crystal display section, for example, or a touch sensor section may be provided separately from a liquid crystal display section, and mounted on the surface of the liquid crystal display section. These touch sensor sections can be for example configured to include driving electrodes, to which a driving signal (alternating-current driving signal VcomAC) for touch detection is applied, and touch detecting electrodes, capacitances being formed between the driving electrodes and the touch detecting electrodes, as in the foregoing embodiment.

In addition, for example, in the foregoing embodiments and the like, the touch sensor is of a capacitance type. However, the present disclosure is not limited to this. Instead of this, the touch sensor may be of an optical type, or may be of a resistive film type.

In addition, for example, in the foregoing embodiments and the like, the display element is a liquid crystal element. However, the present disclosure is not limited to this. Instead of this, the display element may be an EL (Electro Luminescence) element, for example.

In addition, for example, in the foregoing embodiments and the like, the liquid crystal display section 16 and the touch sensor section 17 are combined with each other, and are operated in respective separate periods (display driving periods Pd and touch detection driving periods Pt) so that display operation in the liquid crystal display section 16 and touch detecting operation in the touch sensor section 17 do not affect each other. However, the present disclosure is not limited to this. Instead of this, for example, the liquid crystal display section 16 and a radio communicating section may be combined with each other, and operated in respective separate periods (display driving periods Pd and radio communication periods) so that display operation in the liquid crystal display section 16 and radio communicating operation in the radio communicating section do not affect each other.

Incidentally, the present technology can be configured as follows.

(1) A display device including:

a display section configured to have a plurality of scanning signal lines to which respective scanning signals are applied, the display section performing line-sequential scanning by repeating interruption and resumption of the line-sequential scanning on a basis of the plurality of scanning signals, and displaying an image; and a scanning section configured to generate the plurality of scanning signals such that transition times on a pulse termination side of the respective scanning signals are equal to each other.

(2) The display device according to the above (1), wherein the scanning section has a shift register, the shift register has first transfer blocks including first transfer circuits in a plurality of stages and second transfer blocks, the first transfer blocks and the second transfer blocks being connected alternately in a scanning direction, and the plurality of scanning signal lines are associated with the respective first transfer circuits in the plurality of stages included in the plurality of first transfer blocks.

(3) The display device according to the above (2), wherein transfer operation in the second transfer blocks is delayed, whereby the display section interrupts the line-sequential scanning.

(4) The display device according to the above (2) or (3), wherein the second transfer blocks each have second transfer circuits in a plurality of stages, and transfer operation in at least one of the second transfer circuits in the plurality of stages is delayed.

(5) The display device according to the above (4), wherein transfer operation in at least one of the second transfer circuits in the plurality of stages other than a last stage is delayed.

(6) The display device according to the above (2), wherein the second transfer blocks each have one second transfer circuit.

(7) The display device according to any one of the above (4) to (6), wherein the second transfer circuits have a same circuit configuration as the first transfer circuits.

(8) The display device according to any one of the above (3) to (7), wherein the display section performs line-sequential scanning in each frame, and a transfer operation in one frame and a transfer operation in another frame are delayed in respective different second transfer blocks.

(9) The display device according to any one of the above (2) to (8), wherein the shift register performs transfer operation on a basis of a transfer clock, the scanning section further includes a control section configured to control the shift register by the transfer clock, and the control section delays transfer operation in the second transfer blocks by lengthening at least one of a clock pulse width and a clock pulse interval of the transfer clock.

(10) The display device according to any one of the above (2) to (7), wherein the shift register performs transfer operation on a basis of a transfer clock, the scanning section further includes a control section configured to control the shift register by the transfer clock, and a clock pulse width and a clock pulse interval of the transfer clock are fixed.

(11) The display device according to the above (2) to (10), wherein the second transfer blocks each have a second transfer circuit in one stage or second transfer circuits in a plurality of stages, and the scanning section has a load circuit connected to each of the second transfer circuits.

(12) The display device according to the above (2) to (10), wherein the scanning section further includes a first buffer circuit for generating the scanning signals on a basis of an output signal of each of the first transfer circuits.

(13) The display device according to the above (12), wherein the second transfer blocks each have a second transfer circuit in one stage or second transfer circuits in a plurality of stages, and the scanning section further includes a second buffer circuit supplied with an output signal of each of the second transfer circuits.

(14) The display device according to the above (1), wherein the scanning section includes a shift register for performing transfer operation on a basis of a transfer clock, and a control section configured to control the shift register by the transfer clock, and the control section is configured to be able to change amplitude of the transfer clock.

(15) The display device according to the above (14), wherein the control section lengthens at least one of a clock pulse width and a clock pulse interval of the transfer clock, whereby the display section interrupts the line-sequential scanning.

(16) The display device according to the above (14) or (15), wherein after lengthening clock pulse width of one or a plurality of clock pulses of the transfer clock, the control section returns the clock pulse width of the transfer clock to an original clock pulse width and increases amplitude of the transfer clock.

(17) The display device according to any one of the above (2) to (16), wherein the shift register is formed using transistors of a single conductivity type.

(18) The display device according to any one of the above (1) to (17), further including a touch panel, wherein the touch panel detects an external adjacent object in a period of the interruption of the line-sequential scanning in the display section.

(19) A display method including:

generating a plurality of scanning signals such that transition times on a pulse termination side of the respective scanning signals are equal to each other, and applying the plurality of scanning signals to a plurality of scanning signal lines; and performing line-sequential scanning by repeating interruption and resumption of the line-sequential scanning on a basis of the plurality of scanning signals, and displaying an image.

(20) An electronic device including:

a display device; and a control section configured to perform operation control using the display device;

the display device including a display section configured to have a plurality of scanning signal lines to which respective scanning signals are applied, the display section performing line-sequential scanning by repeating interruption and resumption of the line-sequential scanning on a basis of a plurality of the scanning signals, and displaying an image, and a scanning section configured to generate the plurality of scanning signals such that transition times on a pulse termination side of the respective scanning signals are equal to each other.

The present disclosure contains subject matter related to that disclosed in Japanese Priority Patent Application JP 2012-058218 filed in the Japan Patent Office on Mar. 15, 2012, the entire content of which is hereby incorporated by reference.

What is claimed is:

1. A display device comprising:
a display section configured to have a plurality of scanning signal lines to which respective scanning signals are applied and to display an image on a basis of the scanning signals;
a sensor section configured to perform touch detection according to a touch detection period; and
a scanning section configured to generate the plurality of scanning signals, the scanning section having a shift register,
wherein the shift register has first transfer blocks and second transfer blocks, the first transfer blocks and the second transfer blocks being connected alternately in a scanning direction, the shift register being configured to perform a transfer operation according to a transfer signal that is synchronized with a clock signal:
each of the first transfer blocks has first transfer circuits in stages,
the second transfer blocks each have one or more second transfer circuits respectively in one or more stages, and
the second transfer blocks are respectively configured to delay the transfer signal from a preceding first transfer block to a next first transfer block in synchronism with a first pulse of the clock signal following an end of the touch detection period.

2. The display device according to claim 1, wherein the delay causes the display section to interrupt line-sequential scanning.

3. The display device according to claim 2,
wherein the display section performs the line-sequential scanning in each frame, and
a transfer operation in one frame and a transfer operation in another frame are delayed in respective different second transfer blocks.

4. The display device according to claim 1,
wherein the delay is performed by at least one of the second transfer circuits of a corresponding second transfer block.

5. The display device according to claim 1,
wherein the second transfer circuits have a same circuit configuration as the first transfer circuits.

6. An electronic device comprising:
a display device according to claim 5; and
a control section configured to perform operation control using the display device.

7. The display device according to claim 1,
wherein the second transfer blocks each have one second transfer circuit.

8. The display device according to claim 1, further comprising:
a control section configured to provide the delay by lengthening at least one of a clock pulse width and a clock pulse interval of the transfer signal.

9. The display device according to claim 1,
wherein
a clock pulse width and a clock pulse interval of the transfer signal are fixed.

10. The display device according to claim 1,
wherein
the scanning section has a load circuit connected to each of the second transfer circuits.

11. The display device according to claim 1,
wherein the scanning section further includes a first buffer circuit for generating the scanning signals on a basis of an output signal of each of the first transfer circuits.

12. The display device according to claim 11,
wherein
the scanning section further includes a second buffer circuit supplied with an output signal of each of the second transfer circuits.

13. The display device according to claim 1,
wherein the shift register is formed using transistors of a single conductivity type.

14. The display device according to claim 1, further comprising
a touch panel,
wherein the touch panel detects an external adjacent object in a period of interruption of line-sequential scanning in the display section.

15. A display device comprising:
a display section configured to have a plurality of scanning signal lines to which respective scanning signals are applied and to display an image; and
a scanning section configured to generate the scanning signals,
wherein the scanning section includes
a shift register for performing transfer operation on a basis of a transfer clock, and
a control section configured to control the shift register by the transfer clock, allowing the scanning section to interrupt and resume generating the scanning signals, and
the control section is configured to be able to change amplitude of the transfer clock at least at a timing of a first transfer clock that is resumed after being interrupted.

16. The display device according to claim 15,
wherein the control section lengthens at least one of a clock pulse width and a clock pulse interval of the transfer clock, whereby the display section interrupts line-sequential scanning.

17. The display device according to claim 15,
wherein after lengthening clock pulse width of one or a plurality of clock pulses of the transfer clock, the control section returns the clock pulse width of the transfer clock to an original clock pulse width and increases amplitude of the transfer clock.

18. An electronic device comprising:
a display device according to claim 15; and
a control section configured to perform operation control using the display device.

19. A display method comprising:
generating a plurality of scanning signals by a scanning section, and applying the plurality of scanning signals to a plurality of scanning signal lines;
performing line-sequential scanning by a display section to display an image on a basis of the plurality of scanning signals;
performing, by a sensor section, touch detection according to a touch detection period,
wherein the scanning section has a shift resister, the shift register has first transfer blocks and second transfer blocks, the first transfer blocks and the second transfer blocks being connected alternately in a scanning direction, each of the first transfer blocks has first transfer circuits in stages, and the second transfer blocks each have one or more second transfer circuits respectively in one or more stages;
transferring, by the shift register, an input signal according to a transfer signal that is synchronized with a clock signal; and
delaying, by respective ones of the second transfer blocks, the transfer signal from a preceding first transfer block to a next first transfer block in synchronism with a first pulse of the clock signal following an end of the touch detection period.

* * * * *